(12) United States Patent
Hansen et al.

(10) Patent No.: US 10,842,322 B2
(45) Date of Patent: Nov. 24, 2020

(54) ROTARY MOLDING SYSTEM

(71) Applicant: Provisur Technologies, Inc., Chicago, IL (US)

(72) Inventors: David M. Hansen, Orland Park, IL (US); John Eisenbrandt, Manhattan, IL (US); Joseph A. Ebert, Lockport, IL (US); Scott A. Lindee, Mokena, IL (US); E. William Wight, Roscoe, IL (US); Thomas C. Wolcott, LaGrange, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 278 days.

(21) Appl. No.: 15/788,397

(22) Filed: Oct. 19, 2017

(65) Prior Publication Data
US 2018/0110375 A1   Apr. 26, 2018

Related U.S. Application Data

(60) Provisional application No. 62/410,571, filed on Oct. 20, 2016.

(51) Int. Cl.
*A47J 43/20*   (2006.01)

(52) U.S. Cl.
CPC ..................... *A47J 43/20* (2013.01)

(58) Field of Classification Search
CPC ............ A47J 3/20; A47J 43/20; A22C 7/0084
USPC .......................................................... 99/485
See application file for complete search history.

(56) References Cited

U.S. PATENT DOCUMENTS

| | | |
|---|---|---|
| 1,545,266 A | 7/1925 | Marsa |
| 3,427,649 A | 2/1969 | Fay |
| 3,768,228 A | 10/1973 | Doering |
| 3,813,846 A | 6/1974 | Doering |
| 3,851,355 A | 12/1974 | Hughes |
| 3,887,964 A | 6/1975 | Richards |
| 4,054,967 A | 10/1977 | Sandberg et al. |
| 4,118,831 A | 10/1978 | Holly et al. |
| 4,182,003 A | 1/1980 | Lamartino et al. |
| 4,193,167 A | 3/1980 | Orlowski et al. |
| 4,212,609 A | 7/1980 | Fay |
| 4,276,318 A | 6/1981 | Orlowski et al. |
| 4,284,973 A | 8/1981 | Howell et al. |
| 4,298,326 A | 11/1981 | Orlowski |

(Continued)

FOREIGN PATENT DOCUMENTS

| | | |
|---|---|---|
| EP | 2449893 | 5/2012 |
| FR | 2538223 | 6/1984 |

(Continued)

OTHER PUBLICATIONS

International Search Report from International Patent Application No. PCT/US17/057407 dated Feb. 9, 2018, 4 pages.

(Continued)

*Primary Examiner* — Erin E McGrath
(74) *Attorney, Agent, or Firm* — Klintworth & Rozenblat IP LLP

(57) ABSTRACT

A rotary molding system for use in a patty forming machine and configured to mold food products and a fill plate for use within the rotary molding system are provided. A replaceable wear plate is provided which seats between a reciprocating stripper plate and a fill plate. Each plate has holes through which food product passes. A drum having mold cavities receives the food product from the fill plate.

23 Claims, 28 Drawing Sheets

(56) References Cited

U.S. PATENT DOCUMENTS

| | | | |
|---|---|---|---|
| 4,356,595 A | 11/1982 | Sandberg et al. | |
| 4,404,229 A | 9/1983 | Treharne | |
| 4,646,385 A | 3/1987 | Roberts et al. | |
| 4,653,997 A | 3/1987 | Sheffield et al. | |
| 4,768,260 A | 9/1988 | Sandberg | |
| 4,957,425 A | 9/1990 | Fay | |
| 4,975,039 A | 12/1990 | Dare et al. | |
| 5,297,947 A | 3/1994 | Cardinali | |
| 5,340,599 A | 8/1994 | Maruyama et al. | |
| 5,411,390 A | 5/1995 | Fay | |
| 6,261,620 B1 | 7/2001 | Leadbeater | |
| 6,517,340 B2 | 2/2003 | Sandberg | |
| 6,572,360 B1 | 6/2003 | Buhlke et al. | |
| 6,811,802 B2 | 11/2004 | Van Esbroeck et al. | |
| 7,284,973 B2 | 10/2007 | Van Esbroeck et al. | |
| 7,597,549 B2 | 10/2009 | Van Esbroeck et al. | |
| 7,819,650 B2 | 10/2010 | Meskendahl et al. | |
| 7,862,330 B2 | 1/2011 | Hansen et al. | |
| 7,976,303 B2 | 7/2011 | Van Der Eerden et al. | |
| 8,029,841 B2 | 10/2011 | Van Esbroeck et al. | |
| 8,469,697 B2 | 6/2013 | Lindee et al. | |
| 8,753,107 B2 | 6/2014 | Lindee et al. | |
| 9,028,239 B2 | 5/2015 | Van Gerwen | |
| 9,095,171 B2 | 8/2015 | Lindee et al. | |
| 9,113,638 B2 | 8/2015 | Lindee et al. | |
| 9,114,553 B2 | 8/2015 | Lindee et al. | |
| 9,119,403 B2 | 9/2015 | Van Gerwen | |
| 9,457,495 B2 | 10/2016 | Lindee et al. | |
| 9,485,997 B2 | 11/2016 | Van Gerwen | |
| 9,526,269 B2 | 12/2016 | Van Doorn et al. | |
| 9,635,866 B2 | 5/2017 | Meulendijks et al. | |
| 10,011,053 B2 | 7/2018 | Lindee et al. | |
| 2005/0072312 A1 | 4/2005 | Pasek et al. | |
| 2005/0220932 A1 | 10/2005 | Van Der Eerden et al. | |
| 2007/0098862 A1 | 5/2007 | Hansen et al. | |
| 2007/0224305 A1 | 9/2007 | Meskendahl et al. | |
| 2007/0224306 A1 | 9/2007 | Van Esbroeck et al. | |
| 2007/0295228 A1 | 12/2007 | Gosz et al. | |
| 2008/0233228 A1 | 9/2008 | Lindee et al. | |
| 2009/0134308 A1 | 5/2009 | Van Der Eerden et al. | |
| 2009/0134544 A1 | 5/2009 | Kwon et al. | |
| 2011/0042855 A1 | 2/2011 | Puest et al. | |
| 2012/0058213 A1 | 3/2012 | Lindee et al. | |
| 2013/0224357 A1 | 8/2013 | Van Gerwen | |
| 2014/0199423 A1 | 7/2014 | Righolt et al. | |
| 2015/0320059 A1 | 11/2015 | Lindee et al. | |
| 2016/0255846 A1 | 9/2016 | Lindee et al. | |
| 2017/0224006 A1 | 8/2017 | Seemann et al. | |

FOREIGN PATENT DOCUMENTS

| | | |
|---|---|---|
| WO | 2015/012690 | 1/2015 |
| WO | 2018/111108 A2 | 6/2018 |

OTHER PUBLICATIONS

Written Opinion from International Patent Application No. PCT/US17/057407 dated Feb. 9, 2018, 8 pages.
Translation of FR2538223A1.
International Search Report from corresponding International Patent Application No. PCT/US17/16475 dated Jun. 12, 2017, 5 pages.
Written Opinion from corresponding International Patent Application No. PCT/US17/16475 dated Jun. 12, 2017, 13 pages.
"Plate-Fill-T/F- 30° Angle," Drawing No. ED-9675, dated Jan. 27, 1995, 1 page.
"Hard Chrome," Drawing No. D-22884, dated Feb. 13, 1990, 1 page.
"Plate-Fill-Tenderform 400 Series SST," D-36546, dated Dec. 9, 1998, 1 page.
"Plate-T/F-.25 Dia Angled 45° Roy Alloy EDRO#6," D-67228, dated Jun. 6, 2011, 1 page.
"Plate-Fill-Tenderform RoyAlloy EDRO#6," D-73335, dated Nov. 18, 2014, 1 page.
"Fill Plate-.38 Tenderform," Drawing No. D-73894, dated Oct. 22, 2015, 1 page.
International Preliminary Report on Patentability from International Patent Application No. PCT/US17/057407 dated May 2, 2019, 10 pages.
Extended European Search Report for European Patent Application No. 17861543.1 dated Aug. 12, 2020, 10 pages.

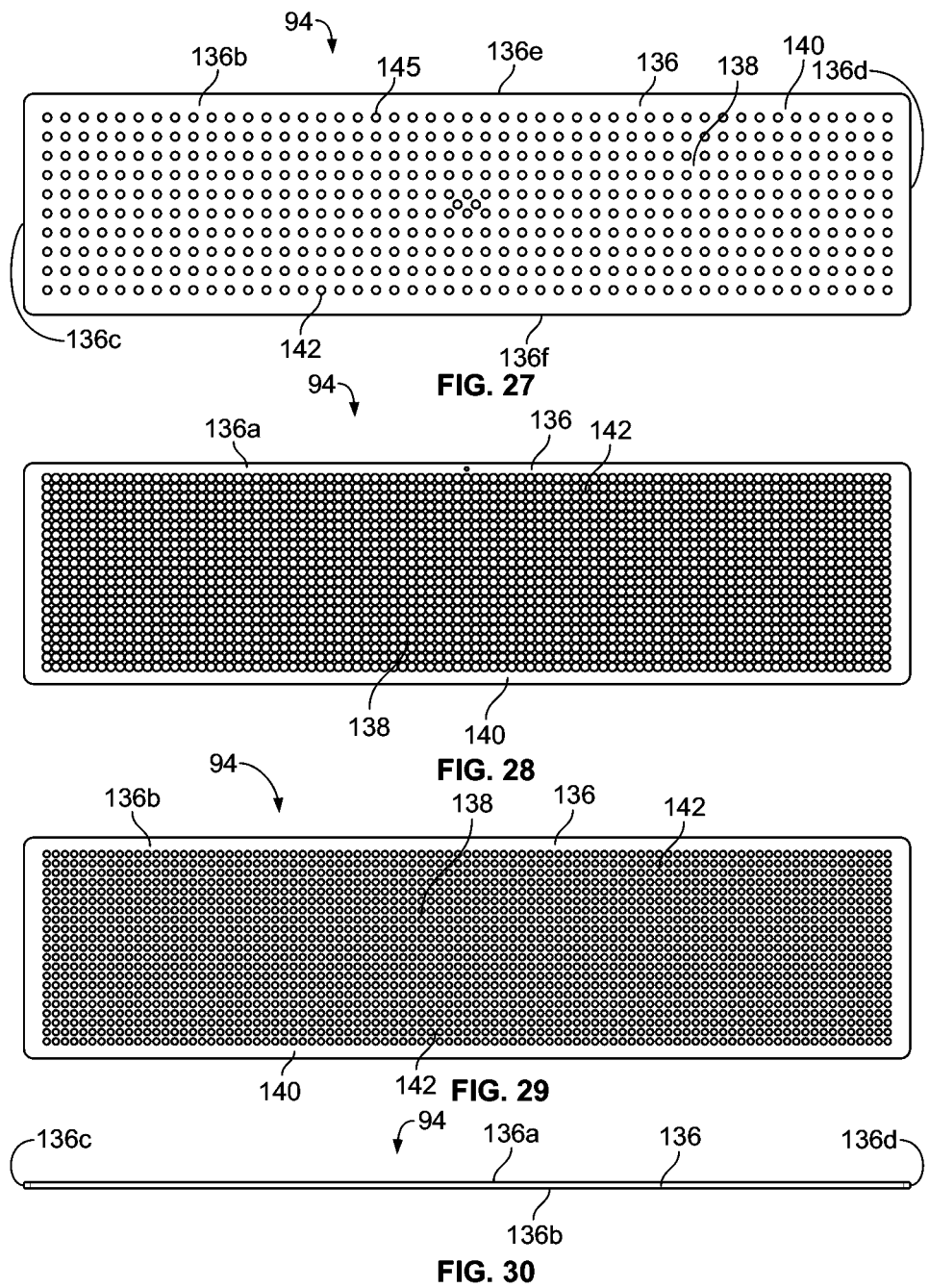

ROTARY MOLDING SYSTEM

CROSS-REFERENCE TO RELATED APPLICATION(S)

This application claims priority to U.S. provisional application Ser. No. 62/410,571, filed on Oct. 20, 2016, the contents of which are incorporated herein in its entirety.

FIELD OF THE DISCLOSURE

The present disclosure relates to a rotary molding system configured for use in a patty forming machine.

BACKGROUND

Food patties of various kinds, including hamburgers, molded steaks, fish cakes, chicken patties, pork patties, potato patties, and others, are frequently formed in high-volume automated molding machines. U.S. Pat. No. 8,469,697 discloses an example of a rotary molding system for molding food products.

SUMMARY

A rotary molding system for use in a patty forming machine and configured to mold food products and a fill plate for use within the rotary molding system are provided.

In accordance with some example embodiments, the rotary molding system includes a stripper plate in communication with a feed source, the stripper plate having a plurality of holes therethrough through which food product is configured to pass; a wear plate having planar first and second surfaces, the stripper plate being capable of moving in a reciprocating manner relative to the wear plate, the wear plate having a plurality of holes therethrough through which food product is configured to pass; a fill plate having a plurality of holes therethrough through which food product is configured to pass, the wear plate being releasably attached to the fill plate; and a cylindrical drum having mold cavities into which food product is configured to be deposited, the drum being proximate to an outlet surface of the fill plate.

In accordance with some example embodiments, the rotary molding system includes a fill plate having a plurality of holes therethrough through which food product is configured to pass; a cylindrical drum having mold cavities into which food product is configured to be deposited, the drum being proximate to the fill plate; and a platen mounted within the drum, the platen including a body having a plurality of passageways therethrough which are in communication with the mold cavities, the drum being configured to rotate relative to the platen.

In accordance with some example embodiments, the rotary molding system includes a fill plate having a plurality of holes therethrough through which food product is configured to pass; a cylindrical drum having mold cavities into which food product is configured to be deposited, the drum being proximate to the fill plate; and a platen mounted within the drum, the platen including a body having drum roller supports provided thereon, and a roller mounted within each drum roller support, the rollers extending partially outwardly from the outer surface of the platen and being in contact with the inner surface of the drum, the drum being configured to rotate relative to the platen and the rollers.

In accordance with some example embodiments, the fill plate includes a plurality of holes through which food product is configured to pass, the holes being aligned in rows and columns such that a central row of holes is defined, each hole in the central row being formed by a straight wall extending from the inlet surface of the fill plate and a tapered wall extending from an outlet end of the straight wall to the outlet surface of the fill plate and a central axis of the straight wall and a central axis of the tapered wall are aligned with each other; and each hole in rows other than the central row being formed by a straight wall extending from the inlet surface of the fill plate and a tapered wall extending from an outlet end of the straight wall to the outlet surface of the fill plate and a central axis of the straight wall and a central axis of the tapered wall are angled relative to each other at an angle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 27 depicts an alternate plan view of the stripper plate of FIG. 26;

FIG. 28 depicts a plan view of an alternate embodiment of a stripper plate of the rotary molding system;

FIG. 29 depicts an alternate plan view of the stripper plate of FIG. 28;

FIG. 30 depicts an elevation view of the stripper plate;

DETAILED DESCRIPTION

Figure 1:
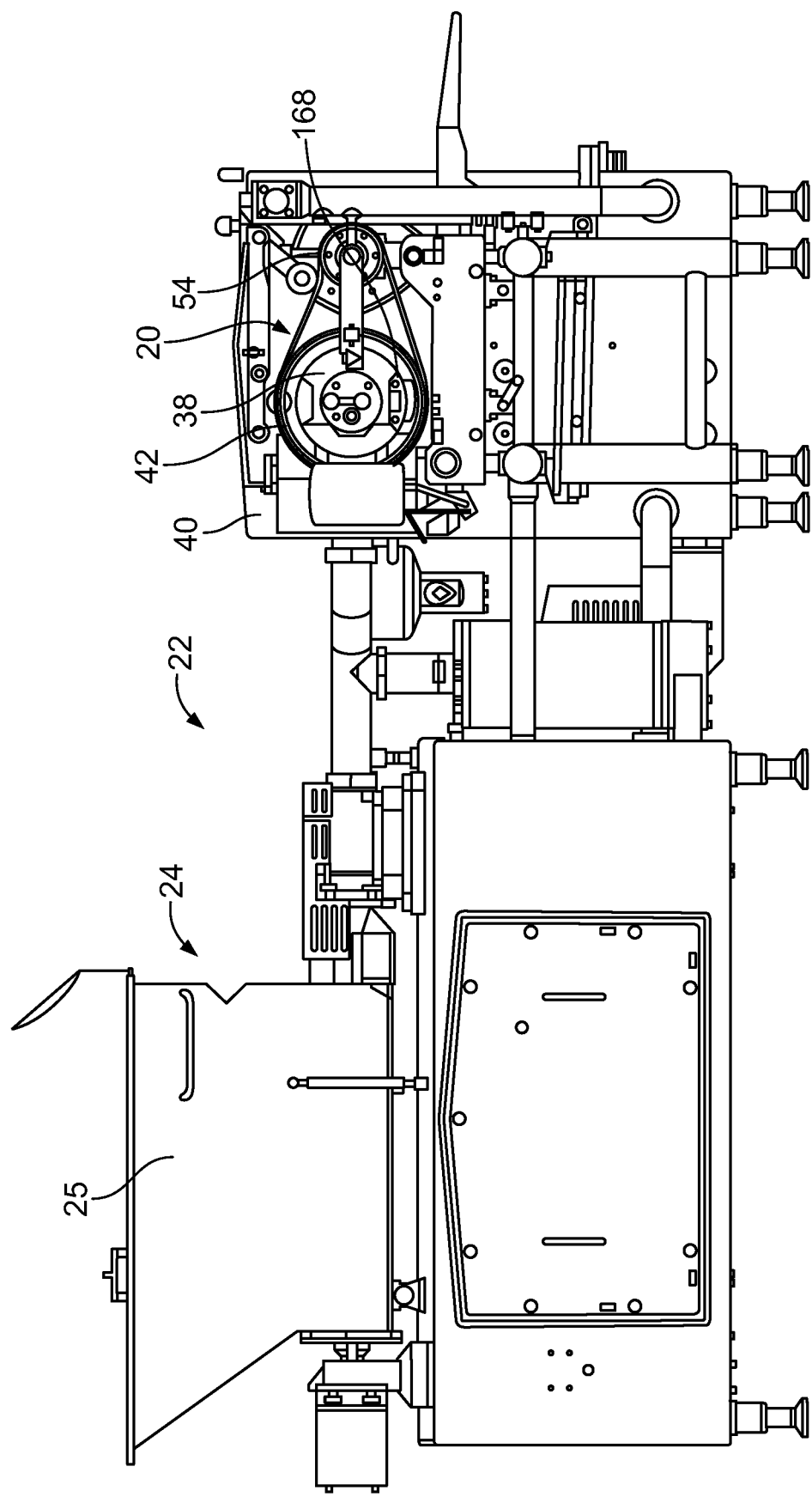
FIG. 1 depicts a side elevation view of a patty forming machine in which a rotary molding system is used.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
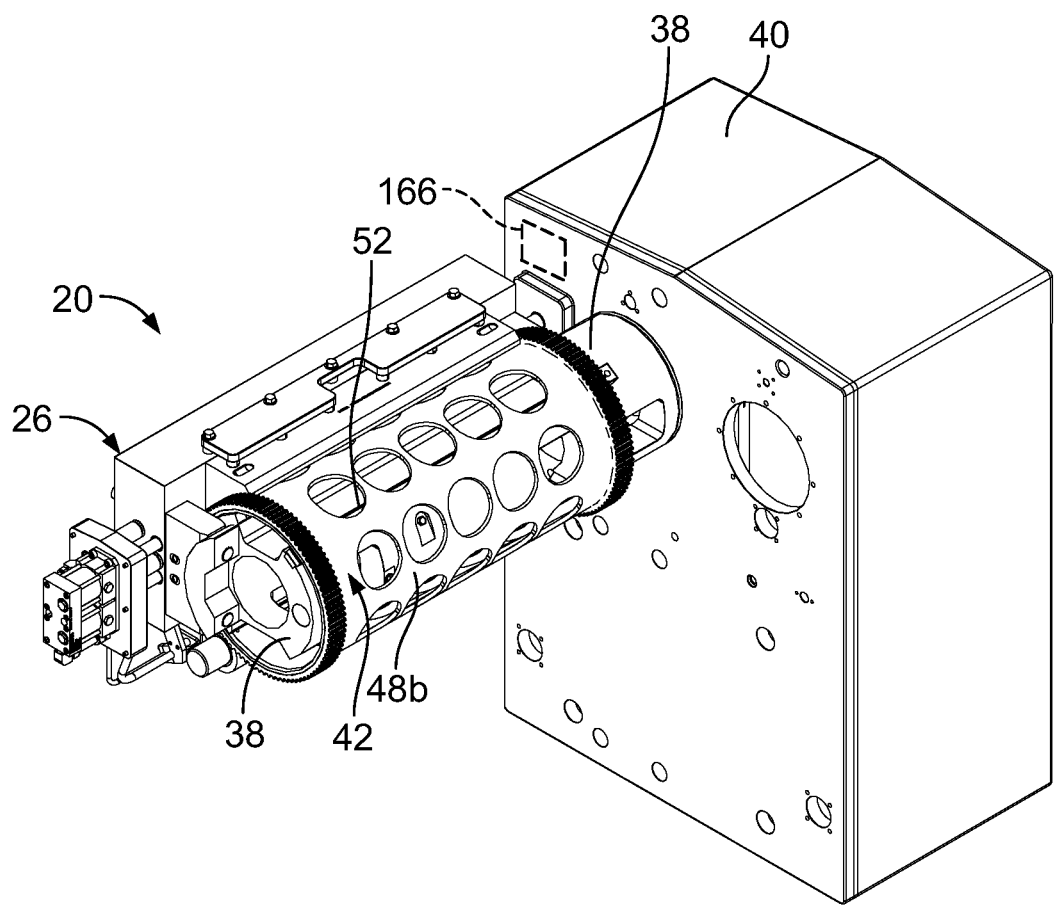
FIG. 2 depicts a perspective view of the rotary molding system.

FIGS. 1 and 2 illustrate the primary components of an embodiment of a rotary molding system 20 configured for use in a patty forming machine 22.

In general, the patty forming machine 22 includes a feeder portion 24 which supplies food product to the rotary molding system 20. In embodiment, the feeder portion 24 is formed from a hopper 25 connected to a pump box 26 by an auger system connected to a pump intake passage, a motor driven rotary pump, and a pump output passage (not shown). Such a feeder portion is disclosed in U.S. Pat. No. 8,469,697, the contents of which are incorporated herein in its entirety by reference, and is not described in detail herein.

Figure 3:
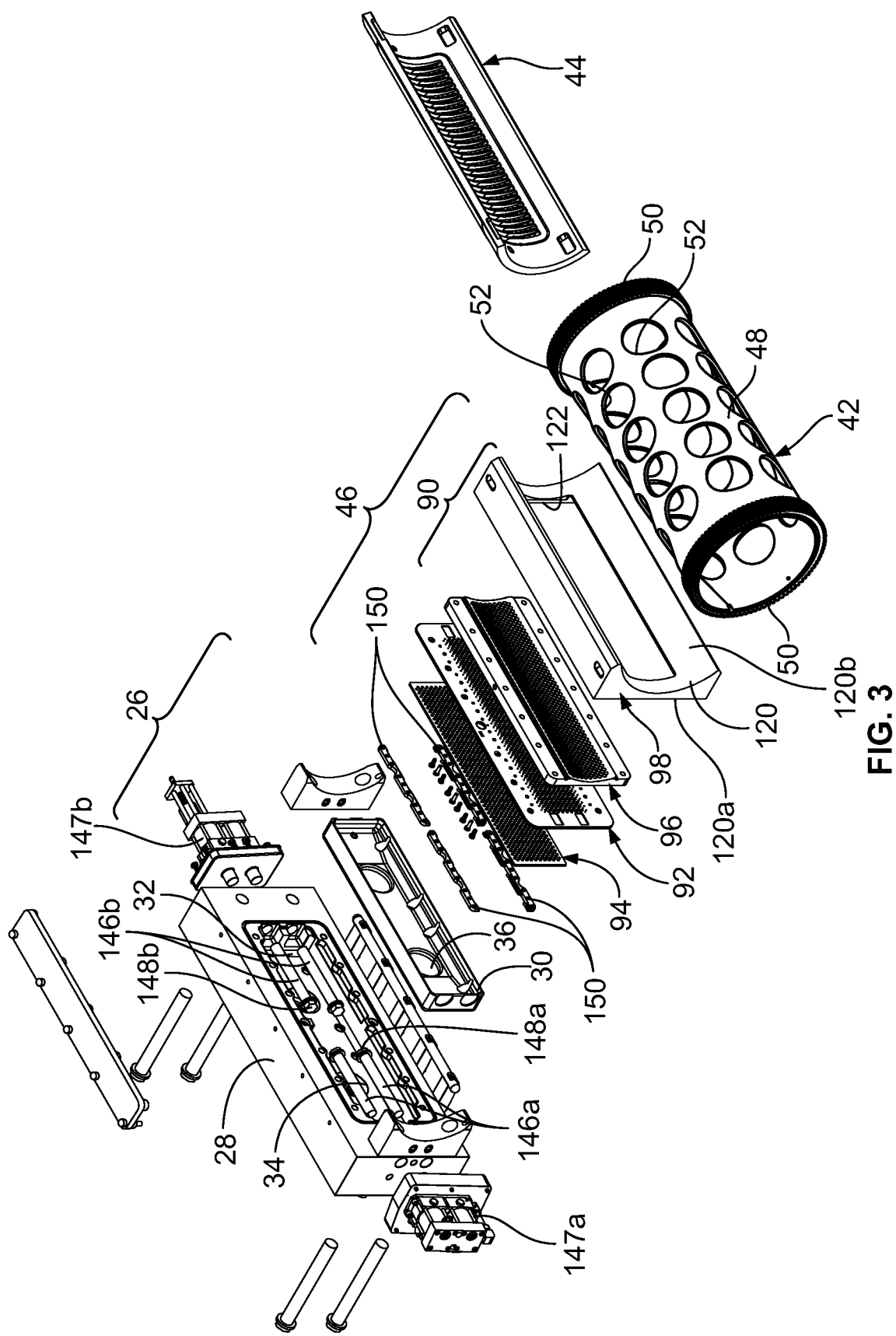
FIG. 3 depicts an exploded perspective view of the rotary molding system.
Figure 4:
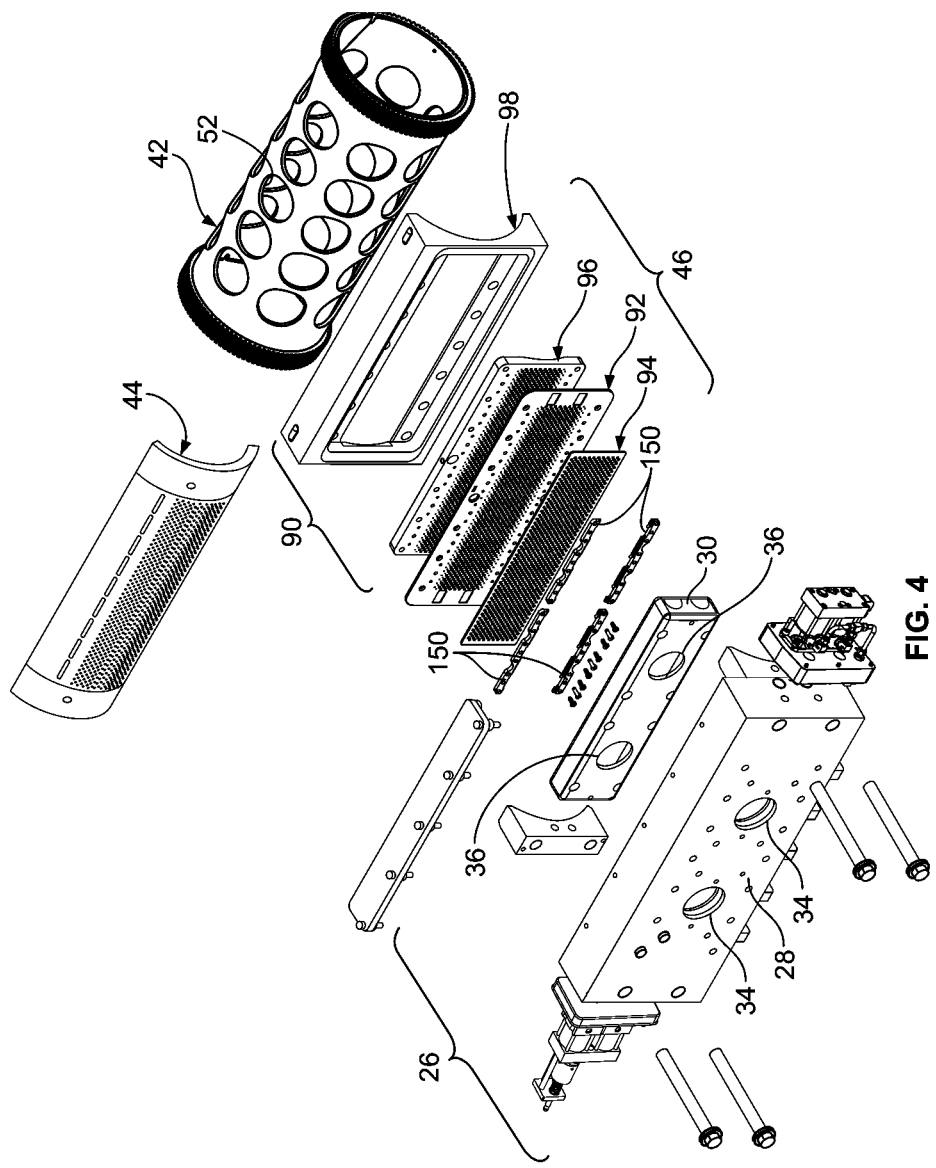
FIG. 4 depicts an alternate exploded perspective view of the rotary molding system.

As shown in FIGS. 3 and 4, the pump box 26 may include a housing 28 and an insert 30 inserted within a chamber 32 in the housing 28. When the housing 28 and insert 30 are connected together, a cavity is formed therebetween. The position of the insert 30 may be adjusted relative to the housing 28 in order to vary the size of the cavity therebetween. The housing 28 has at least one feed opening 34 and the insert 30 has at least one feed opening 36 to channel food product from the hopper 25 through the pump box 26. The feed openings 34, 36 may be aligned. In an embodiment, the pump box 26 is formed of a single component.

The rotary molding system 20 includes a stationary support structure 38 which is attached to a cabinet 40 of the patty forming machine 22, a rotary hollow mold or drum 42 rotatably mounted on the support structure 38 by an inner platen 44, and a food channel assembly 46 which directs food product from the pump box 26 to the drum 42.

In an embodiment, the support structure 38 has an outer surface 38a and is cantilevered from the cabinet 40. The support structure 38 may be formed of steel. Alternatively, the support structure 38 can be supported on both ends. In an embodiment, the support structure 38 is a mandrel.

Figure 5:
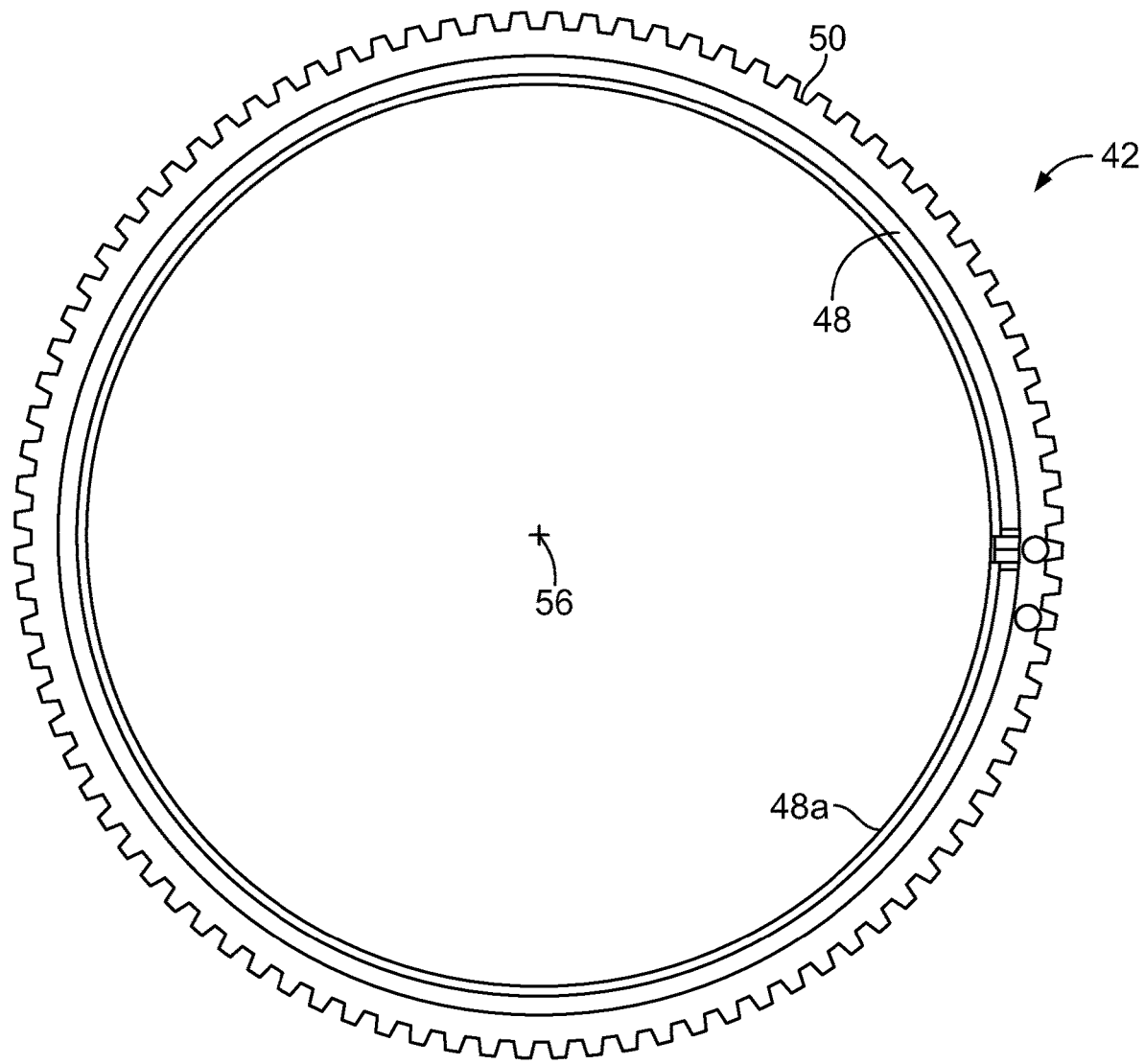
FIG. 5 depicts a side elevation view of a rotary hollow mold or drum of the rotary molding system.
Figure 6:
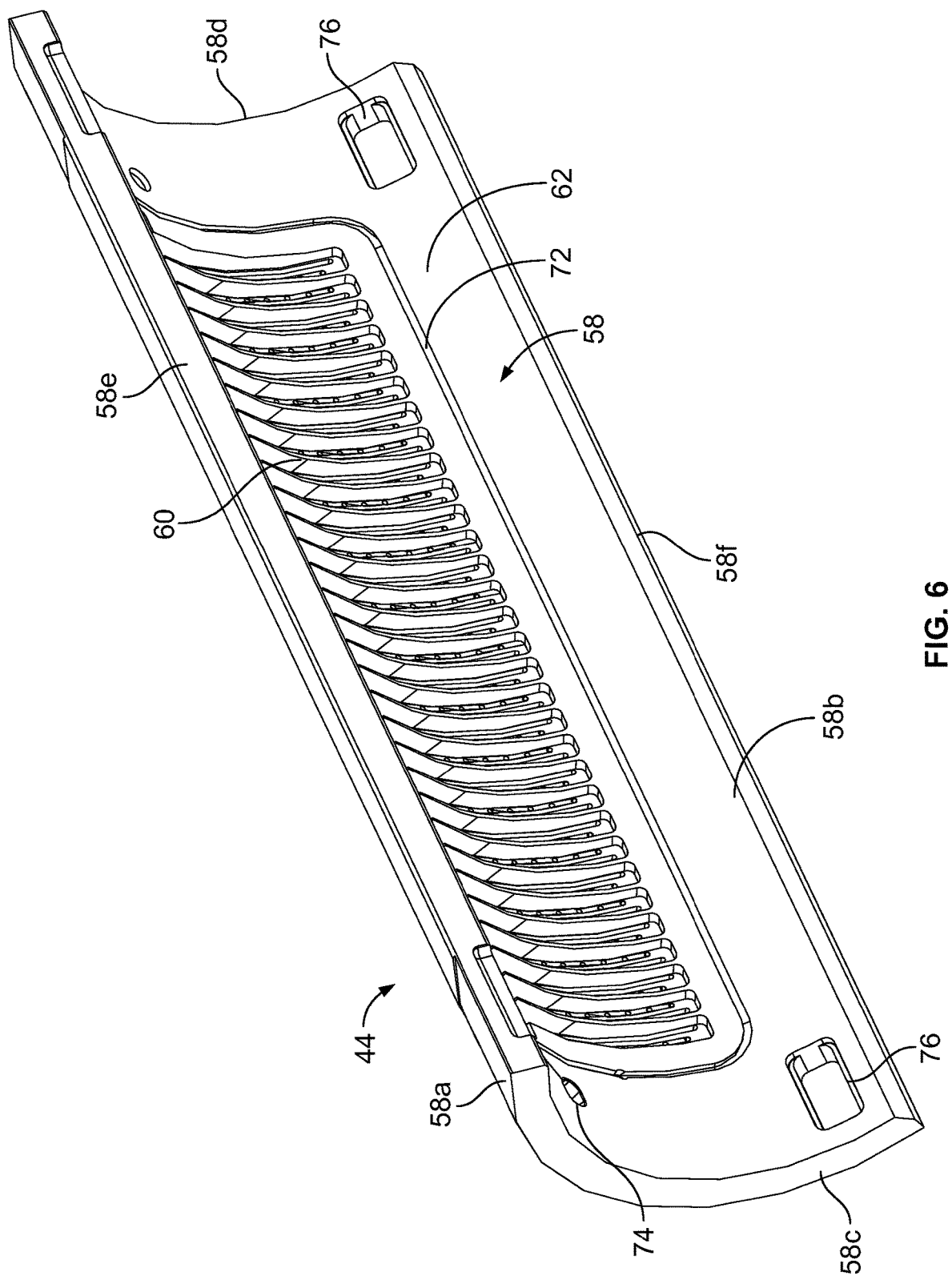
FIG. 6 depicts a perspective view of an inner platen of the rotary molding system.
Figure 7:
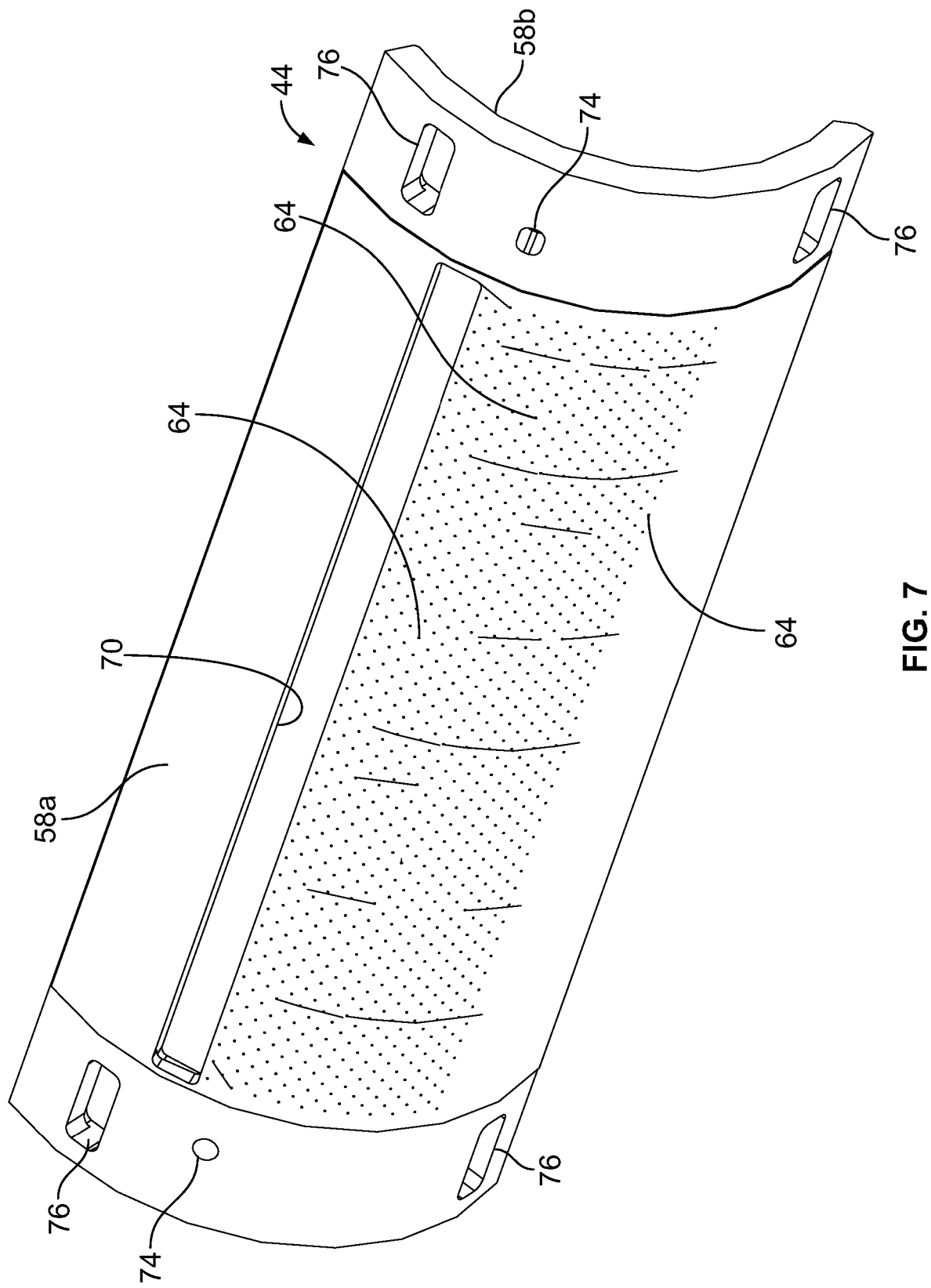
FIG. 7 depicts an alternate perspective view of the inner platen.
Figure 8:
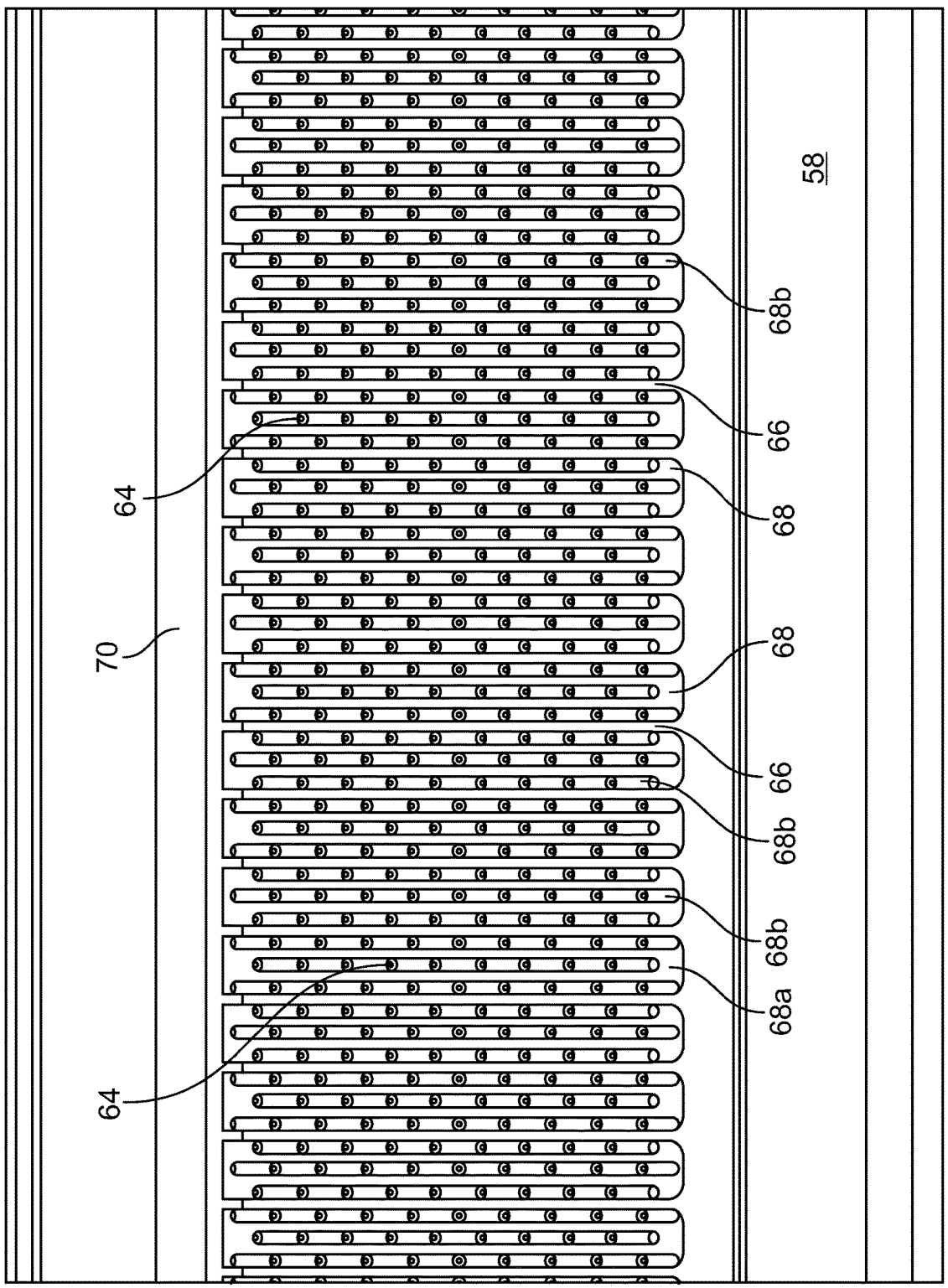
FIG. 8 depicts a plan view of a portion of the inner platen.
Figure 9:
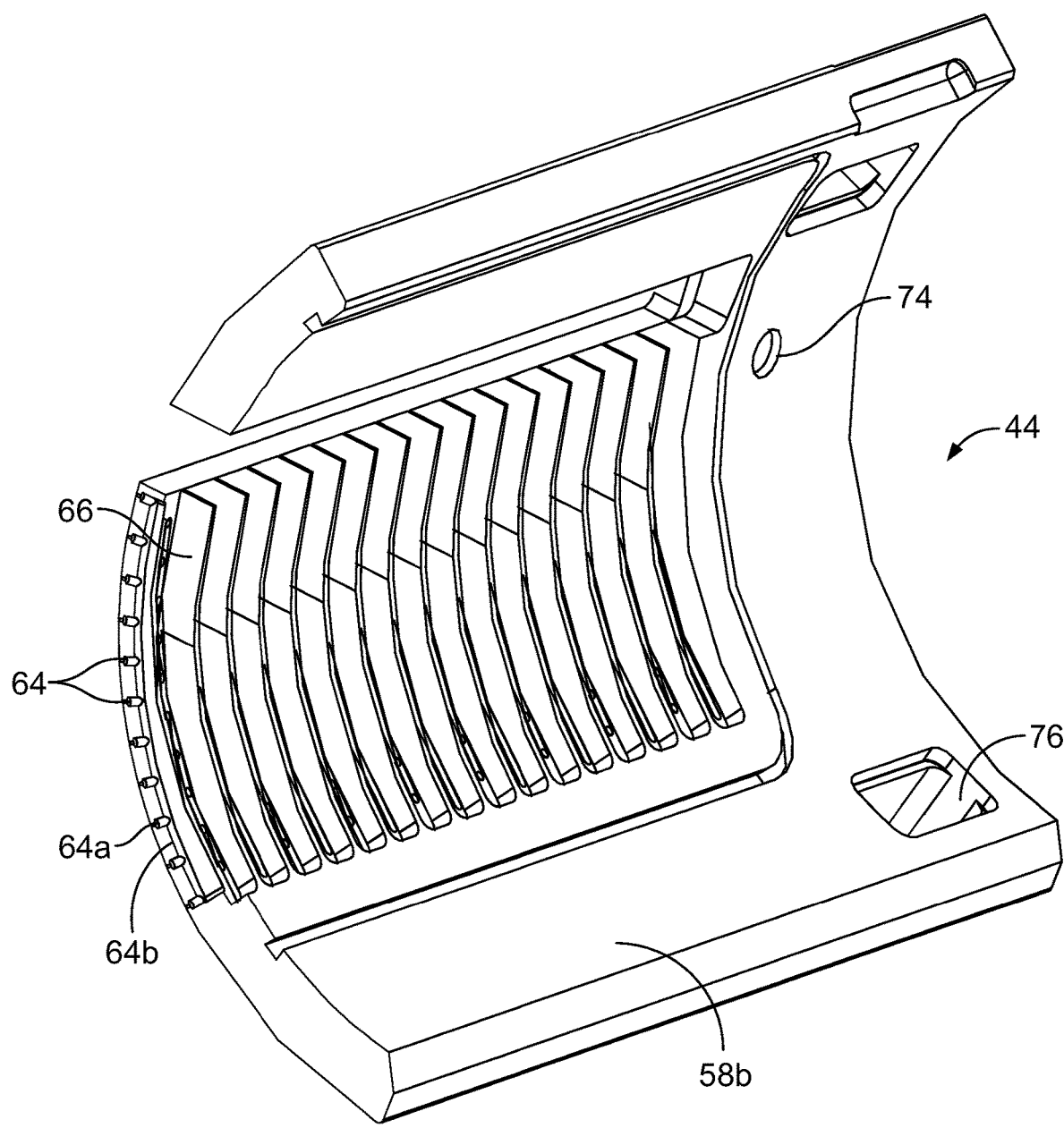
FIG. 9 depicts a perspective view of the inner platen showing a portion of the inner platen in cross-section.

The drum 42, see FIG. 5, is formed of a cylindrical wall 48 having an outer surface 48a and an inner surface 48b, and a toothed gear ring 50 extending about the circumference of the outer surface 48a of the wall 48 at each end thereof. A plurality of spaced apart mold cavities 52 are provided through the wall 48 and are disposed around the circumference of the wall 48. The wall 48 has a thickness which corresponds to the depth of the mold cavities 52. The number of mold cavities 52 around the circumference of the wall 48 can vary. In addition, the shape of the mold cavities 52 can vary. Structure 54 for rotating the drum 42 around the support structure 38, such as driven toothed endless belts, are provided. Such a structure 54 for rotating the drum 42 is disclosed in U.S. Pat. No. 8,469,697, the contents of which have been incorporated herein, and is not described in detail herein. The drum 42 rotates about a central axis 56.

The inner platen 44, see FIGS. 6-9, is formed from a body 58 having a drum facing surface 58a and support structure engaging surface 58b defined by parallel side edges 58c, 58d and parallel end edges 58e, 58f. A length of the inner platen 44 is defined between the side edges 58c, 58d. The drum facing surface 58a is curved in accordance with the radius of curvature of the cylindrical drum 42. The support structure engaging surface 58b may be curved. The inner platen 44 may be formed of plastic.

The body 58 has a central perforated portion 60 with a non-perforated portion 62 extending around the perimeter of the central perforated portion 60 and between the central perforated portion 60 and the edges 58c, 58d, 58e, 58f. The central perforated portion 60 provides an air management system for allowing air to escape the mold cavities 52 as food product fills the mold cavities 52 and displaces the air in the mold cavities 52.

The central perforated portion 60 includes an array of a plurality of distinct holes 64 which form rows and columns, a plurality of fins 66 separating columns of the holes 64 from each other and forming recesses 68 therebetween which are in communication with the holes 64, and an elongated opening 70 proximate to the fins 66. In an embodiment, the fins 66 extend perpendicular to the axis of rotation of the drum 42 and partially between the end edges 58e, 58f. In an embodiment, the fins 66 are curved in accordance with the radius of curvature of the drum 42. Each recess 68 may be formed of a first recess part 68a which extends between adjacent fins 66 and extends from the surface of the central perforated portion 60 and a plurality of second recess parts 68b which extend from the first recess part 68a. The second recess parts 68b are recessed further from the support structure engaging surface 58b than the respective first recess part 68a. The column of holes 64 may be in communication with the second recess part 68b. The columns of holes 64 may be transverse to the length of the body 58. In an embodiment, the holes 64 in alternating columns are aligned with each other. In an embodiment, the holes 64 have a diameter of 0.04 to 0.06 inches. The holes 64 may be formed of a first smaller diameter portion 64a which extends from the drum facing surface 58a and a second larger diameter portion 64b which extends from the first portion to the second recess part 68b.

The elongated opening 70 extends along a portion of the length of the body 58 and is proximate to the recesses 68 and is in communication with the recesses 68.

A continuous recess 71 extends around the perimeter of the central perforated portion 60 into which an O-ring 72 is seated.

The inner platen 44 is affixed to the support structure 38 by suitable means such as fasteners which extend through apertures 74 provided through the non-perforated portion 62.

Figure 10:
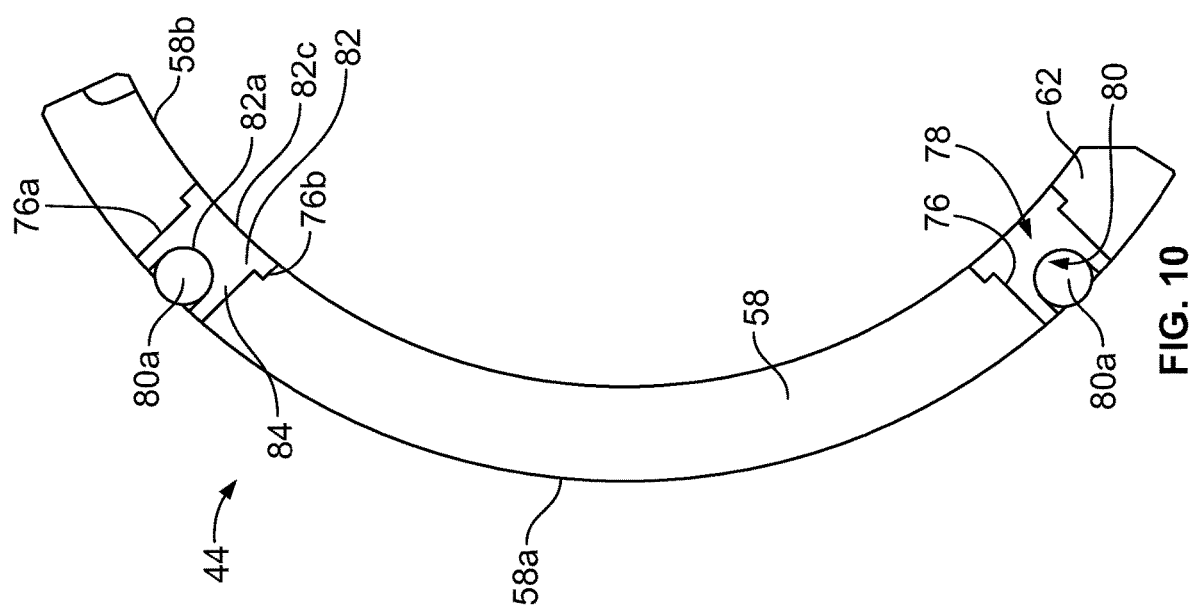
FIG. 10 depicts a cross-sectional view of the inner platen.
Figure 13:
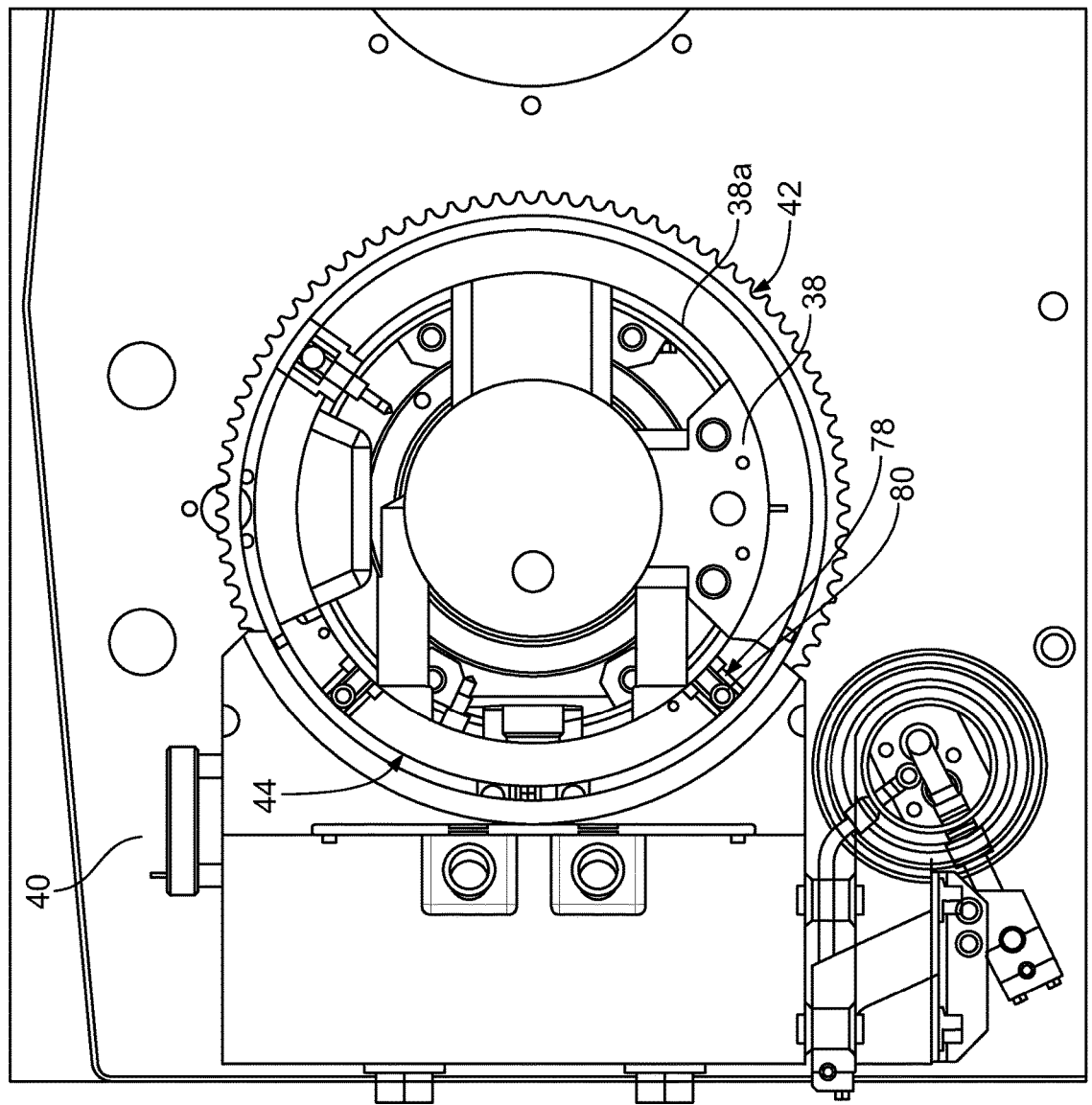
FIG. 13 depicts an enlarged side elevation view of a portion of the patty forming machine.
Figure 14:
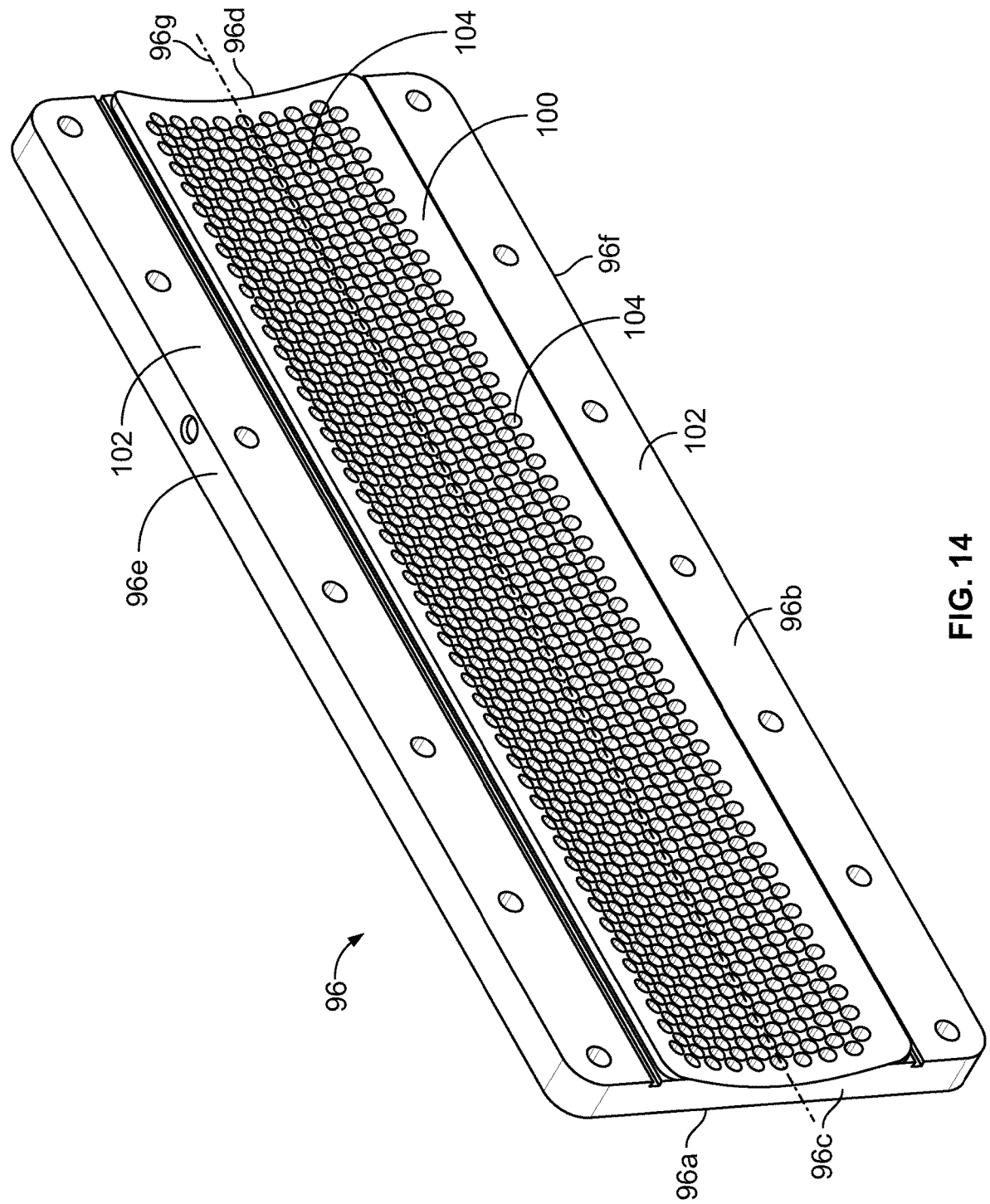
FIG. 14 depicts a perspective view of an inner perforated body of the rotary molding system.
Figure 15:
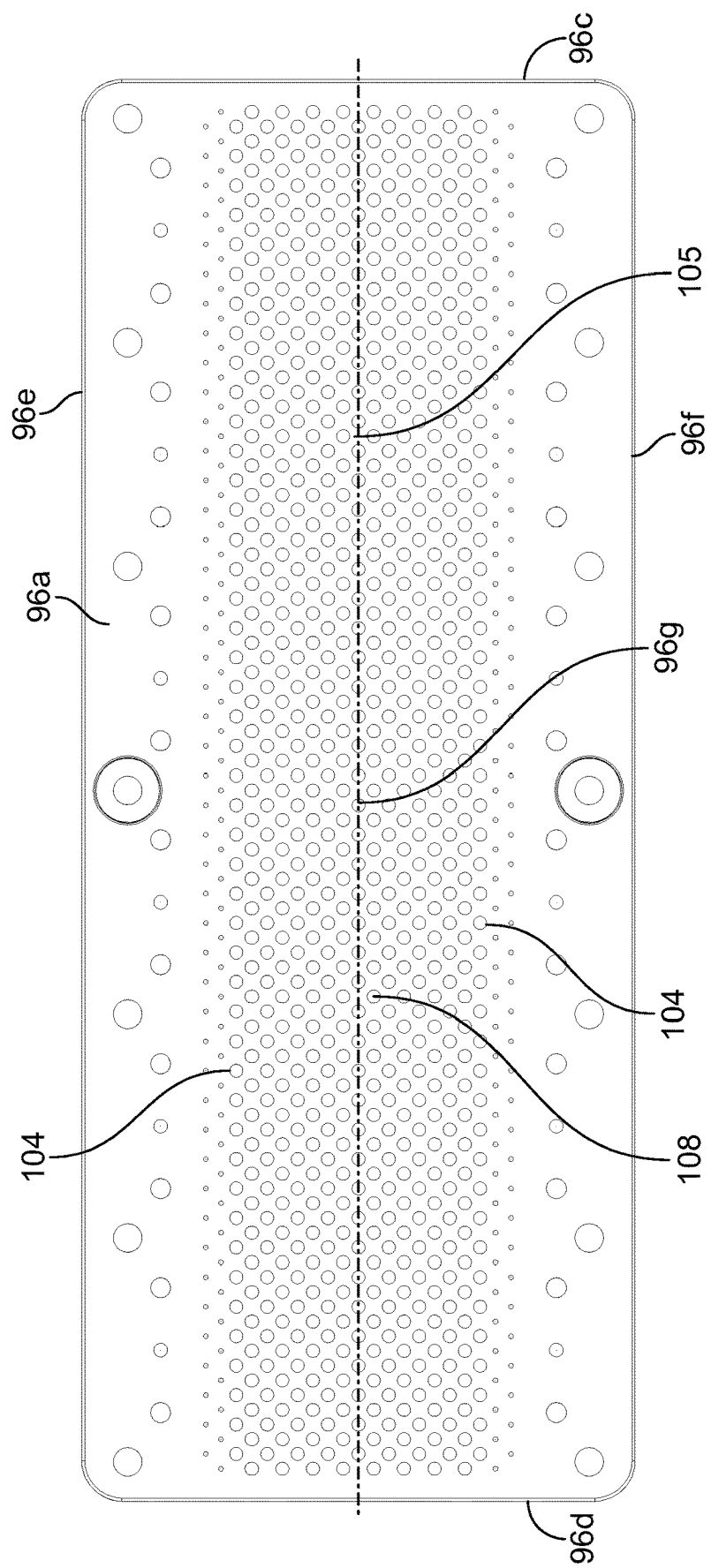
FIG. 15 depicts a plan view of the inner perforated body.

A plurality of roller mounting apertures 76 are provided in the non-perforated portion 62. As best shown in FIG. 10, each roller mounting aperture 76 has a first section 76a which extends from the drum facing surface 58a of the inner platen 44, and a second section 76b which extends from the first section 76a to the support structure engaging surface 58b of the inner platen 44. The first section 76a has a dimension which is smaller than the second section 76b. In an embodiment, the first and second sections 76a, 76b are rectangular.

Figure 12:
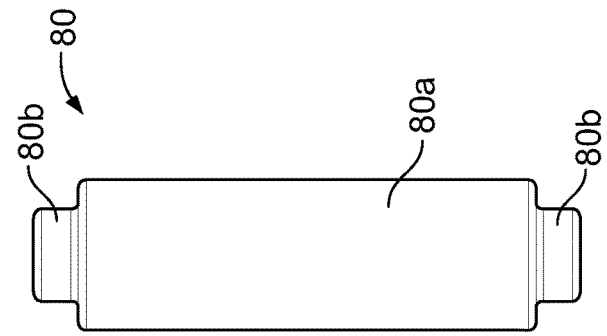
FIG. 12 depicts a plan view of a roller which mounts in the drum roller support.
Figure 11:
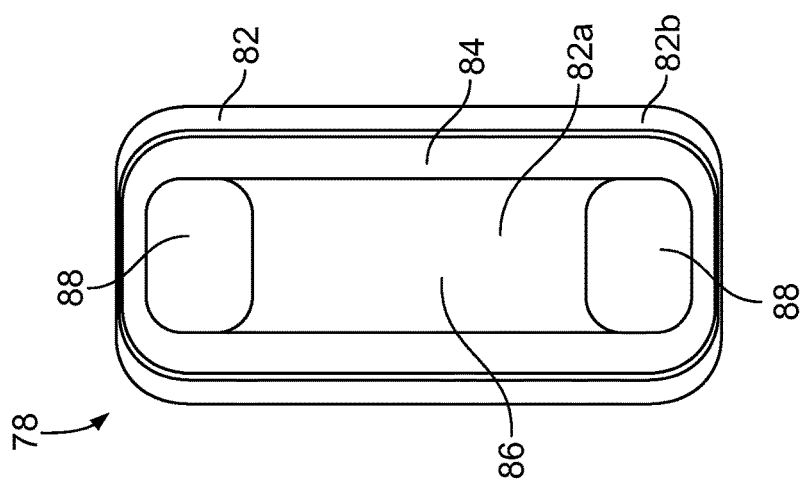
FIG. 11 depicts a plan view of a drum roller support mounted on the inner platen.

A drum roller support 78, see FIG. 11, is mounted within each roller mounting aperture 76 and supports an elongated cylindrical roller 80, see FIG. 12. The drum roller support 78 is formed of a base wall 82 and a side wall 84 depending therefrom. The base wall 82 and the side wall 84 define an open-ended cavity 86. A pair of spaced apertures 88 are provided through the base wall 82 and are in communication with the cavity 86. The portion of the base wall 82 between the apertures 88 forms a curved race 82a. The base wall 82 extends outwardly of the side wall 84 and forms a flange 82b. In an embodiment, the surface 82c opposite to the race 82a is planar. In an embodiment, the surface 82c is curved. While the drum roller support 78 is described as a separate component, the drum roller support 78 may be integrally formed as part of the body 58 of the inner platen 44.

The flange 82b of the drum roller support 78 seats within the second section 76b of the mounting aperture 76 and the side wall 84 seats within the first section 76a of the mounting aperture 76. The flange 82b corresponds in shape to the second section 76b and the side wall 84 corresponds in shape to the first section 76a so as to provide a secure fit between the drum roller support 78 and the inner platen 44.

In an embodiment, each roller 80 has a central cylindrical body section 80a and a reduced cylindrical end section 80b at both ends of the body section 80a. In an embodiment, the body section 80a of each roller 80 is crowned to provide a self-aligning feature when the rollers 80 contact the inner surface of the drum 42 as described herein. The rollers 80 may be formed of plastic or metal. In an embodiment, each roller 80 is about 2 inches long.

The body section 80a of the roller 80 seats against the race 82a of the drum roller support 78. The body section 80a is wider than the cavity 86 such that the body section 80a partially protrudes outwardly from the side wall 84 of the drum roller support 78.

When the inner platen 44 is mounted on the support structure 38, the outer ends of the fins 66 are proximate to the outer surface 38a of the support structure 38 and the O-ring 72 engages against the outer surface 38a of the support structure 38. The surface 82c of each drum roller support 78 engages against the outer surface 38a of the support structure 38. The drum 42 is mounted on the inner platen 44 such that the drum facing surface 58a of the inner platen 44 is proximate to the inner surface 48b of the drum 42 and the rollers 80 engage the inner surface 48b of the drum 42. The drum 42 rotates around the inner platen 44 and the support structure 38.

The food channel assembly 46 includes a fill plate 90 which is proximate to the drum 42, a wear plate 92 fixedly attached to the fill plate 90, and a stripper plate 94 attached to the wear plate 92 and capable of movement relative to the wear plate 92, see FIGS. 3 and 4. The food channel assembly 46 is attached to the housing 28 of the pump box 26. In an embodiment, the fill plate 90 is formed of two parts, with an inner perforated body 96 which seats within an outer platen 98. The body 96 is formed of metal. The outer platen 98, if provided, is formed of plastic.

The inner perforated body 96 has an inlet surface 96a and an outlet surface 96b defined by parallel side edges 96c, 96d and parallel end edges 96e, 96f. The body 96 has a centerline 96g which extends between the side edges 96c, 96d. The body 96 has a central perforated portion 100 with non-perforated portions 102 extending between the central perforated portion 100 and the end edges 96e, 96f. The inlet surface 96a is planar. The outlet surface 96b formed by the central perforated portion 100 is curved in accordance with the radius of curvature of the drum 42. The outlet surface 96b formed by the non-perforated portions 102 may be planar as shown, or may be curved in accordance with the radius of curvature of the drum 42. A length of the fill plate 90 is defined between the side edges 96c, 96d.

An array of a plurality of distinct holes 104 are provided through the body 96 in the central perforated portion 100. In an embodiment and as shown, the holes 104 in the fill plate 90 are aligned in rows and columns; the rows extending between the side edges 96c, 96d and the columns extending between end edges 96e, 96f. A central row 105 of holes 104 is formed along the centerline 96g of the body 96. In an embodiment, the holes 104 in the fill plate 90 are randomly placed. In an embodiment, the holes 104 in the fill plate 90 have a diameter of 0.25 inches to 0.4375 inches. In an embodiment, the fill plate 90 has an elongated feeder inlet passage (not shown) through which the food product passes to enter the mold cavities 52. An example of a curved fill plate 90 is shown in U.S. Pat. No. 8,469,697, the contents of which have been incorporated herein. Because of the shape of the fill plate 90, the fill plate 90 is an expensive component to make and can be an expensive component to properly maintain.

Figure 16:
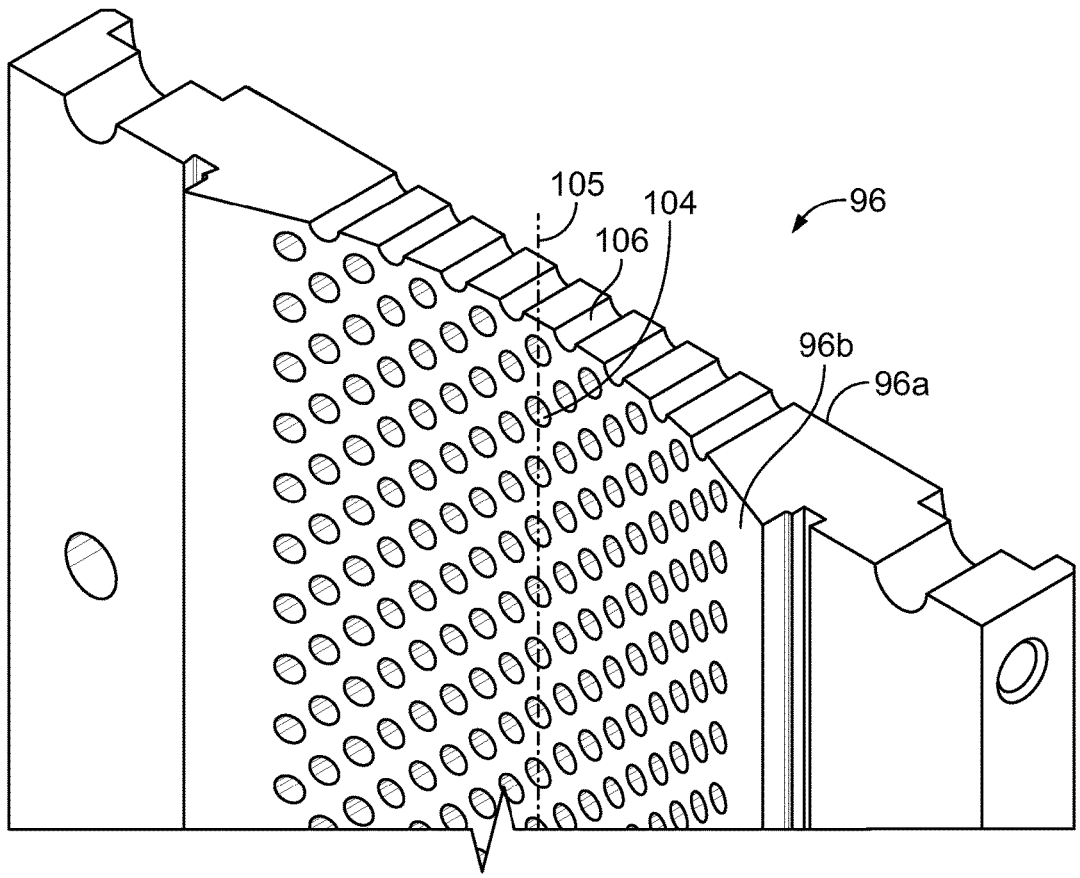
FIG. 16 depicts a perspective view of an embodiment of the inner perforated body showing a portion of the inner perforated body in cross-section.
Figure 17:
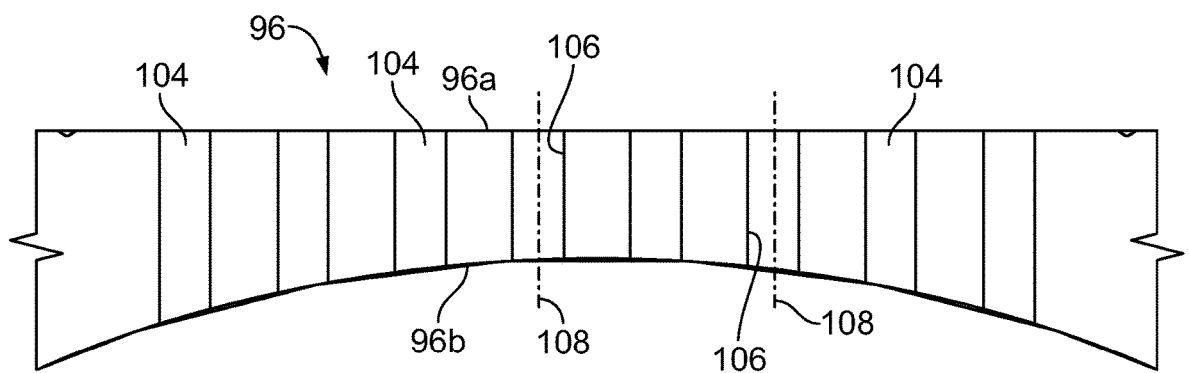
FIG. 17 depicts a cross-sectional view of the inner perforated body of FIG. 16.

In a first embodiment as shown in FIGS. 16 and 17, the wall 106 forming each hole 104 is straight from the inlet surface 96a to the outlet surface 96b, that is each hole 104 has a uniform diameter along its length from the inlet surface 96a to the outlet surface 96b. The central axis 108 of each hole 104 is parallel to each other and is transverse to the centerline 96g of the body 96.

Figure 18:
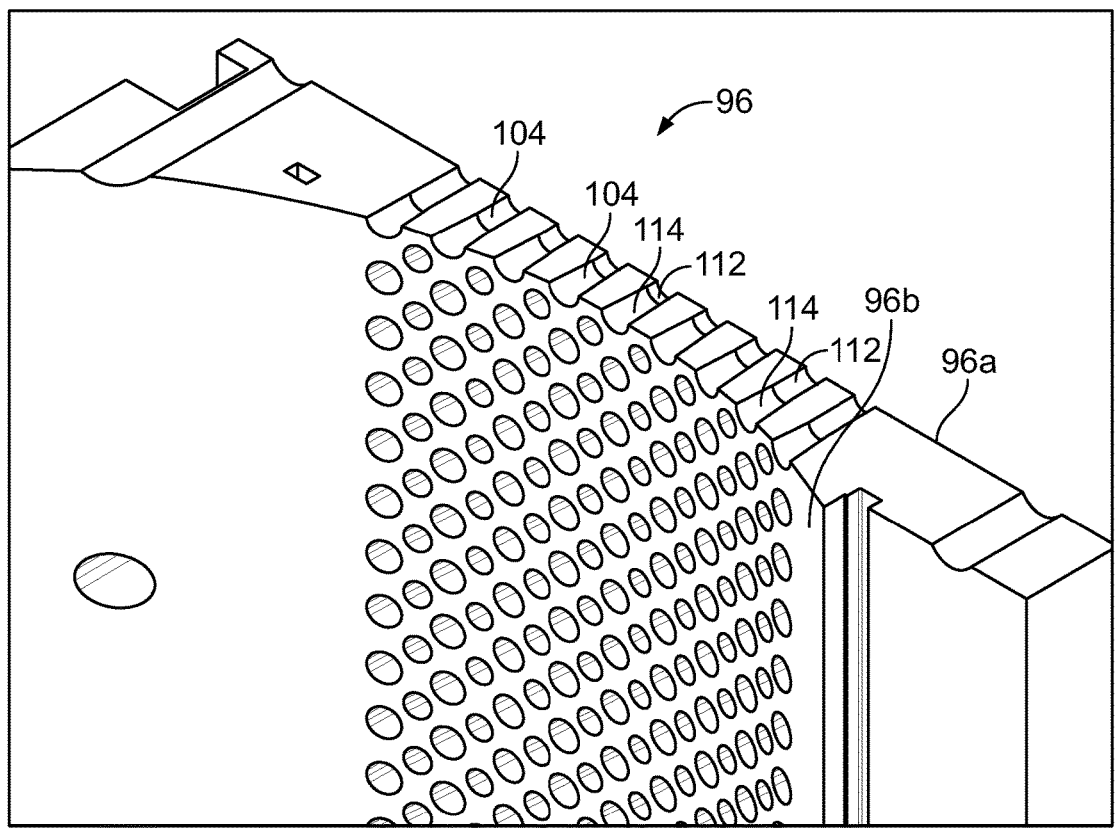
FIG. 18 depicts a perspective view of another embodiment of the inner perforated body showing a portion of the inner perforated body in cross-section.
Figure 19:
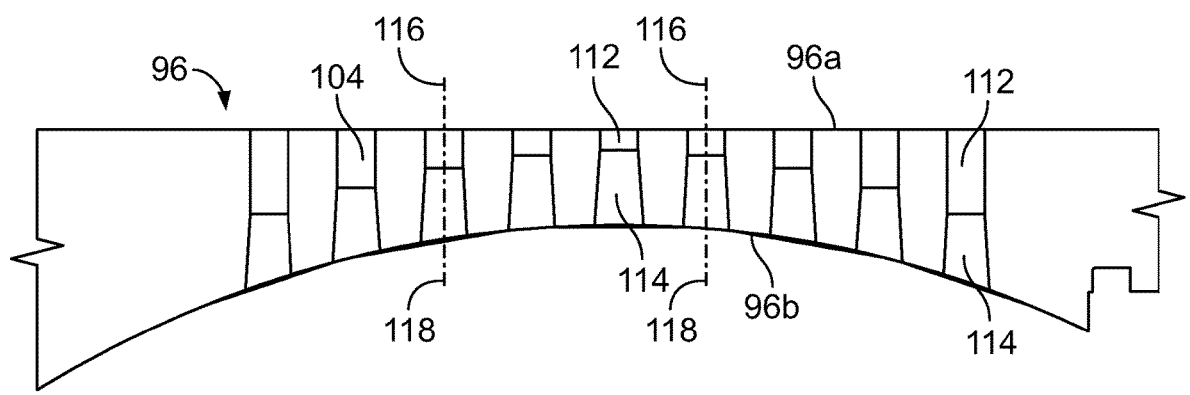
FIG. 19 depicts a cross-sectional view of the inner perforated body of FIG. 18.

In a second embodiment as shown in FIGS. 18 and 19, each of the holes 104 in the array or predetermined ones of the holes 104 in the array have a straight wall 112 extending from the inlet surface 96a and a tapered or frustoconical wall 114 extending from the outlet end of the straight wall 112 to the outlet surface 96b. Each straight wall 112 has a uniform diameter along its length from the inlet surface 96a to the tapered or frustoconical wall 114. Each tapered or frustoconical wall 114 has its smallest diameter (which corresponds to the diameter of the straight wall 112) at its inlet end where tapered or frustoconical wall 114 joins with the straight wall 112 and has its largest diameter at its outlet end which is at the outlet surface 96b. The tapered or frustoconical wall 114 has a continuously increasing diameter as it extends along its length from its inlet end to its outlet end. The tapered or frustoconical wall 114 may extend along a small section of the length of the hole 104, along half or the length of the hole 104, or along almost the entire length of the hole 104. In each hole 104, a central axis 116 of the straight wall 112 and a central axis 118 of the tapered or frustoconical wall 114 are aligned with each other. The central axis 116/118 of each hole 104 is parallel to each other and is transverse to the centerline 96g of the body 96. In an embodiment, the length of the straight wall 112 increases as the rows move outwardly from the central row 105 of holes 104.

Figure 20:
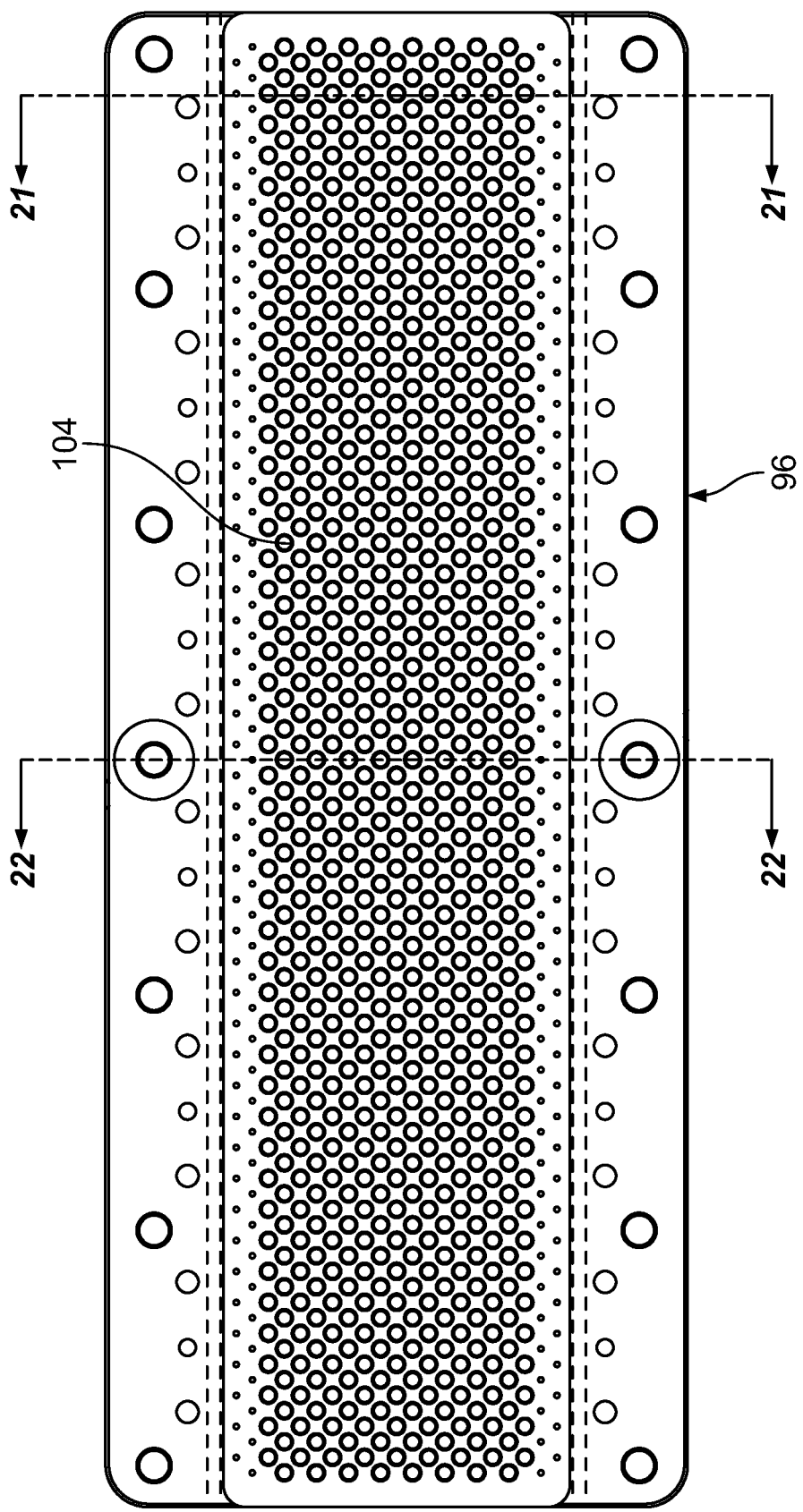
FIG. 20 depicts a plan view of an embodiment of the inner perforated body.
Figure 21:
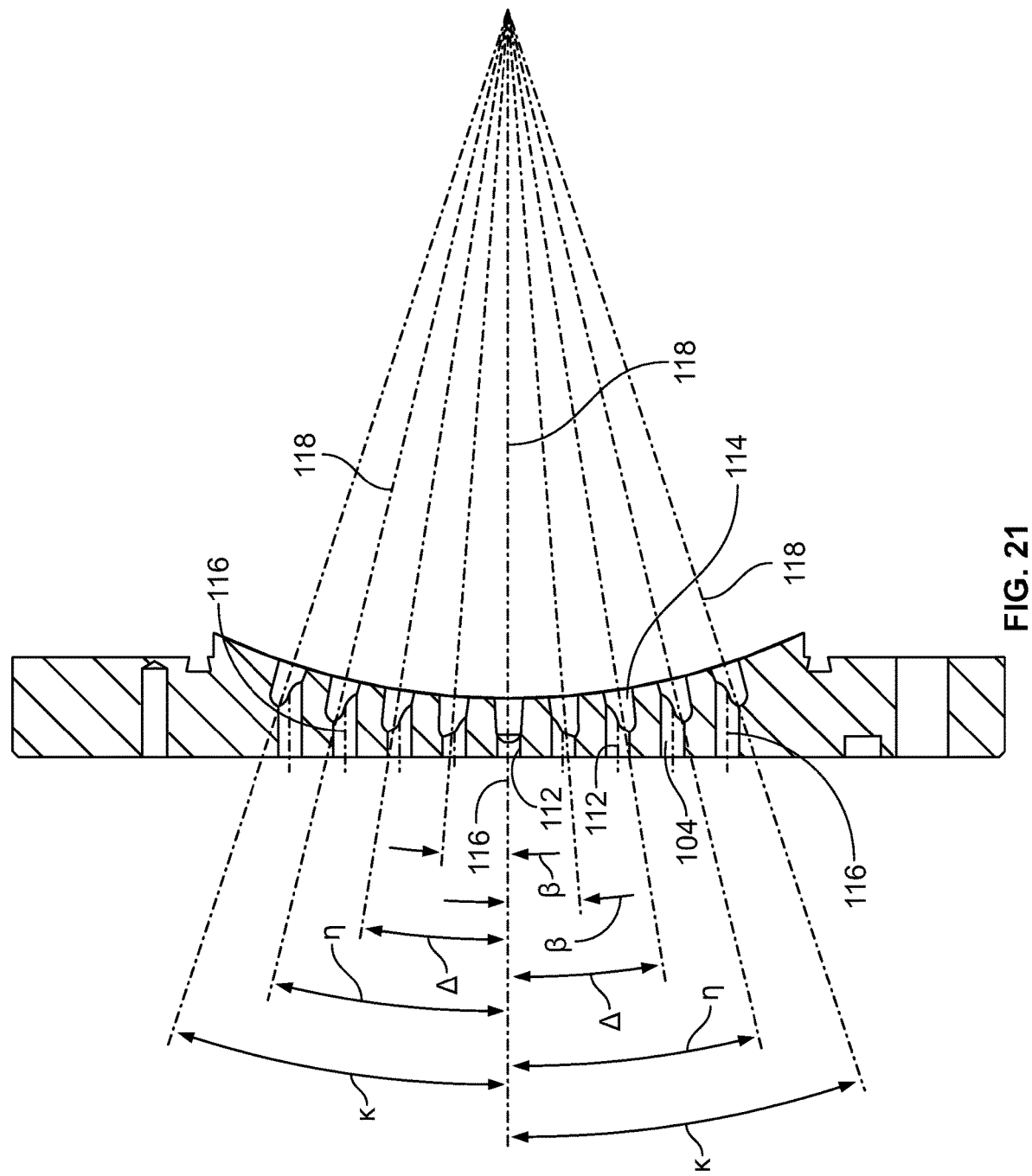
FIG. 21 depicts a cross-sectional view along line 21-21 of FIG. 20.
Figure 22:
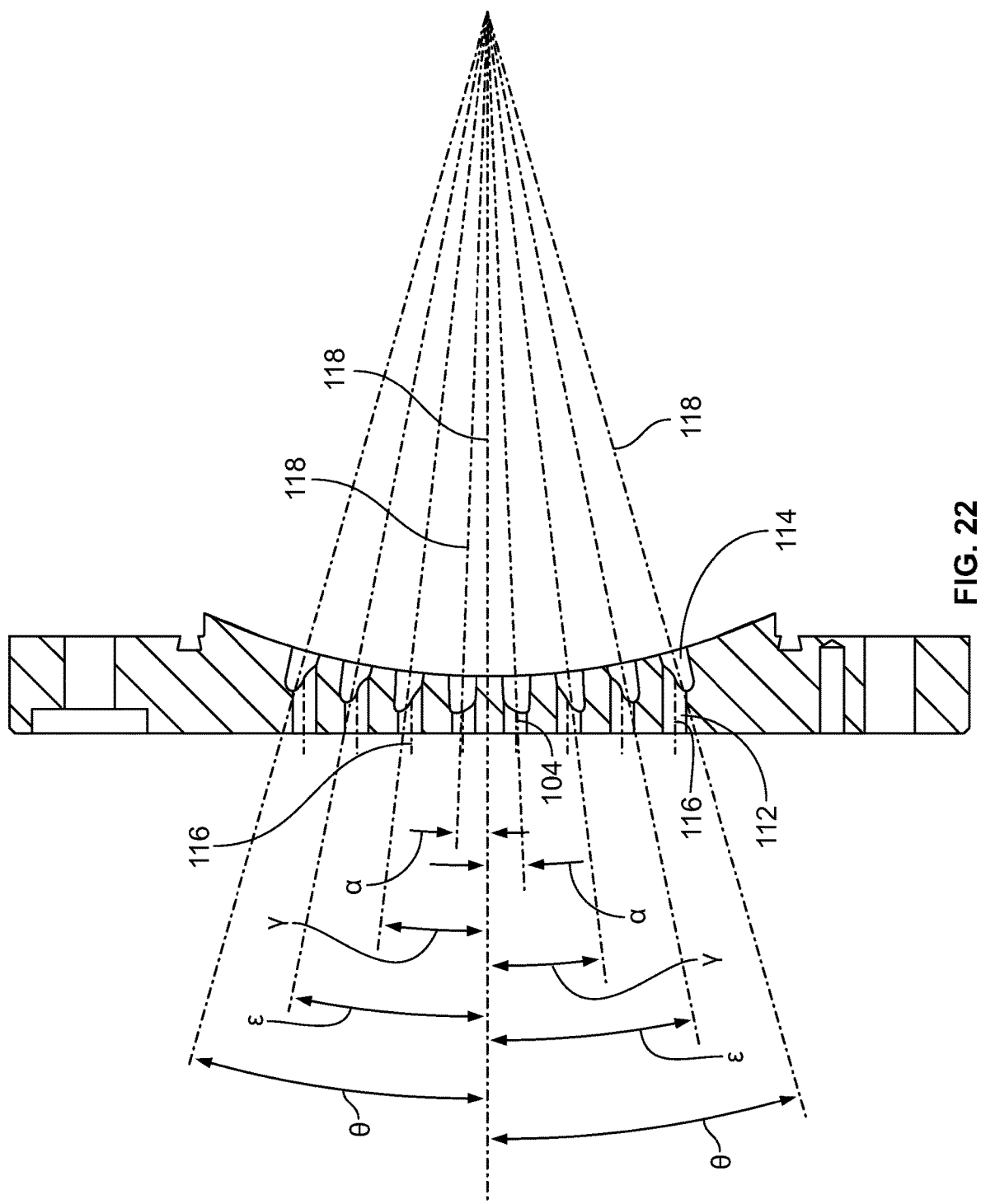
FIG. 22 depicts a cross-sectional view along line 22-22 of FIG. 20.

In a third embodiment as shown in FIGS. 20-22, all holes 104 in the central row 105 have a straight wall 112 extending from the inlet surface 96a and a tapered or frustoconical wall 114 extending from the outlet end of the straight wall 112 to the outlet surface 96b. Each straight wall 112 has a uniform diameter along its length from the inlet surface 96a to the tapered or frustoconical wall 114. Each tapered or frustoconical wall 114 has its smallest diameter (which corresponds to the diameter of the straight wall 112) at its inlet end where tapered or frustoconical wall 114 joins with the straight wall 112 and has its largest diameter at its outlet end which is at the outlet surface 96b. The tapered or frustoconical wall 114 has a continuously increasing diameter as it extends along its length from its inlet end to its outlet end. The tapered or frustoconical wall 114 may extend along a small section of the length of the hole 104, along half or the length of the hole 104, or along almost the entire length of the hole 104. In each hole 104, the central axis 116 of the straight wall 112 and the central axis 118 of the tapered or frustoconical wall 114 are aligned with each other. The central axis 116/118 of each hole 104 in the central row 105 is aligned with each other and is transverse to the centerline 96g of the body 96. The central axis 116 of the straight wall 112 and the central axis 118 of the tapered or frustoconical wall 114 of each hole 104 in the array which is offset from the central row 105 of holes 104 are at an angle to each other, and the tapered or frustoconical wall of each hole 104 is angled relative to the plane formed by the centerline 96g of the body 96. The holes 104 in the rows adjacent to the central row 105 are defined as the second rows; the holes 104 in the rows adjacent to the second rows are defined as the third rows; the holes 104 in the rows adjacent to the third rows are defined as the fourth rows; and so forth. As the rows progress outwardly from the central row 105, the angle increases. As an example, the holes 104 in the second row are angled at an angle α of 2.25 degrees relative to the centerline 96g; the holes 104 in the third row are angled at an angle β of 4.5 degrees relative to the centerline 96g; the holes 104 in the fourth row are angled at an angle γ of 6.75 degrees relative to the centerline 96g; the holes 104 in the fifth row are angled at an angle Δ of 9 degrees relative to the centerline 96g; the holes 104 in the sixth row are angled at an angle ε of 11.25 degrees relative to the centerline 96g; the holes 104 in the seventh row are angled at an angle η of 13.5 degrees relative to the centerline 96g; the holes 104 in the eight row are angled at an angle θ of 15.75 degrees relative to the centerline 96g; the holes 104 in the ninth row are angled at an angle κ of 18 degrees relative to the centerline 96g. More than or fewer than nine rows of holes 104 can be provided. The central axis 116 of the straight wall 112 of each hole 104 in the rows adjacent to the central row 105 is parallel to each other and is transverse to the centerline 96g. By angling the holes 104 which are not in the center row in this manner, the food product is directed to the middles of the mold cavities 52. As an alternative in this embodiment, the holes 104 in the central row 105 may be straight, that is, the holes 104 have a uniform diameter along its length.

The holes 104 in the fill plate 90 may be a combination any of the types of holes 104 shown.

The outlet surface 96b of the body 96 is in in close proximity to, but spaced from, the outer surface of the drum 42. The body 96 extends for a length which corresponds approximately to, or just slightly greater than, the distance spanned by the row of mold cavities 52 in the drum 42. A sealing mechanism or layer (not shown) may be disposed on outlet surface of the body 96 to ensure adequate close contact with the drum 42 and to prevent food product from leaking from the mold cavities 52 once the mold cavities 52 are filled.

When the body 96, the drum 42 and the inner platen 44 are assembled together, the holes 64 in the inner platen 44 are offset from the holes 104 in the body 96. In addition, the body 96 has substantially more holes 104 than the number of holes 64 in the inner platen 44.

In an embodiment, the body 96 is mounted in outer platen 98 which forms a frame for the body 96. The outer platen 98 is formed from a body 120 having an inlet surface 120a which is planar and an outlet surface 120b which is curved in accordance with the radius of curvature of the drum 42. A passageway 122 is provided through the body 120 and extends from the inlet surface 120a to the outlet surface 120b. The body 96 seats within the passageway 122. In an embodiment, the outer platen 98 is sandwiched between the pump box 26 and the drum 42, and is free floating relative to the pump box 26 and drum 42. In an embodiment, the outer platen 98 is affixed to the housing 28 of the pump box 26 by suitable means such as bolts, and is spaced from the drum 42.

Figure 23:
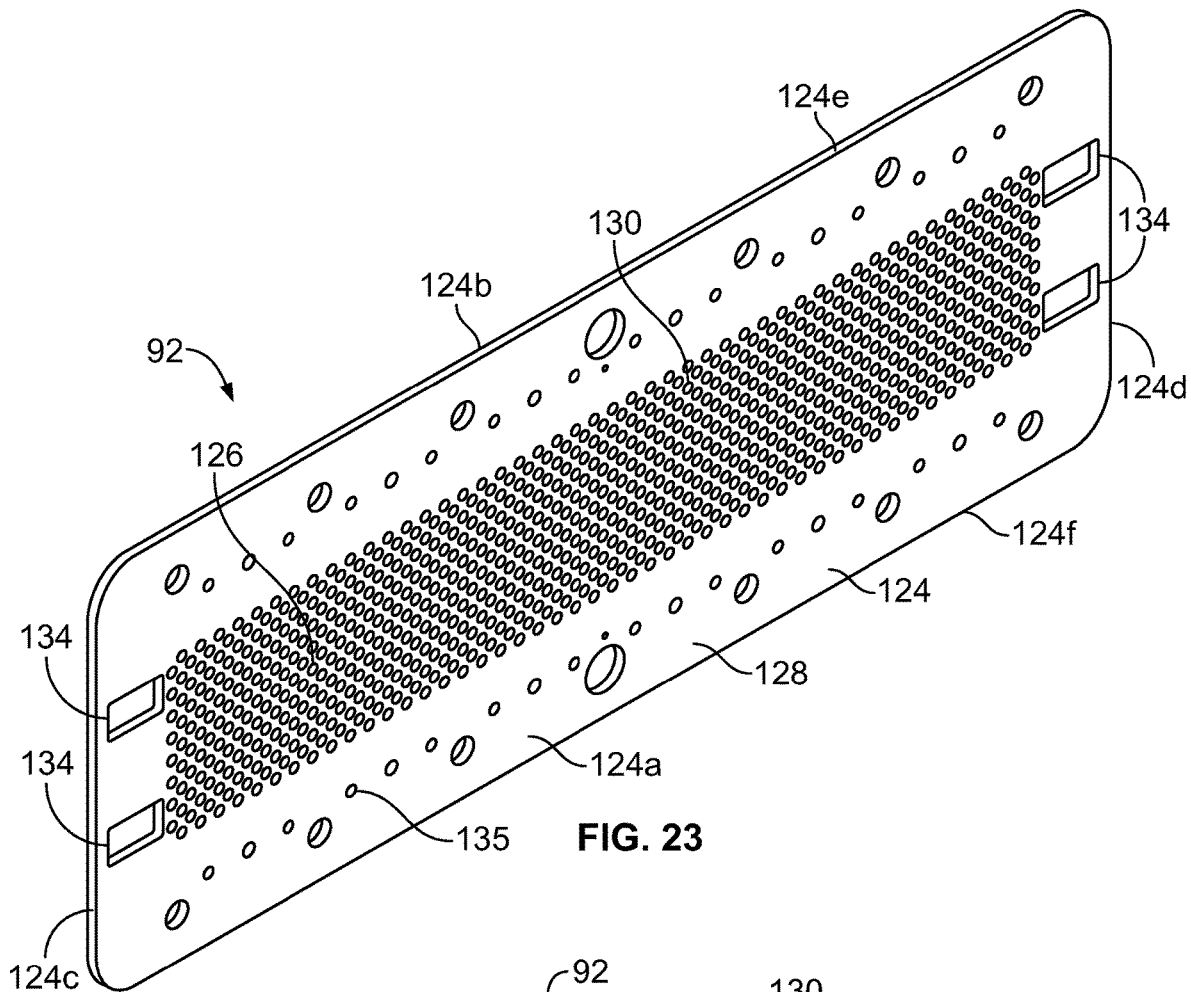
FIG. 23 depicts a perspective view of an embodiment of a wear plate of the rotary molding system.
Figure 24:
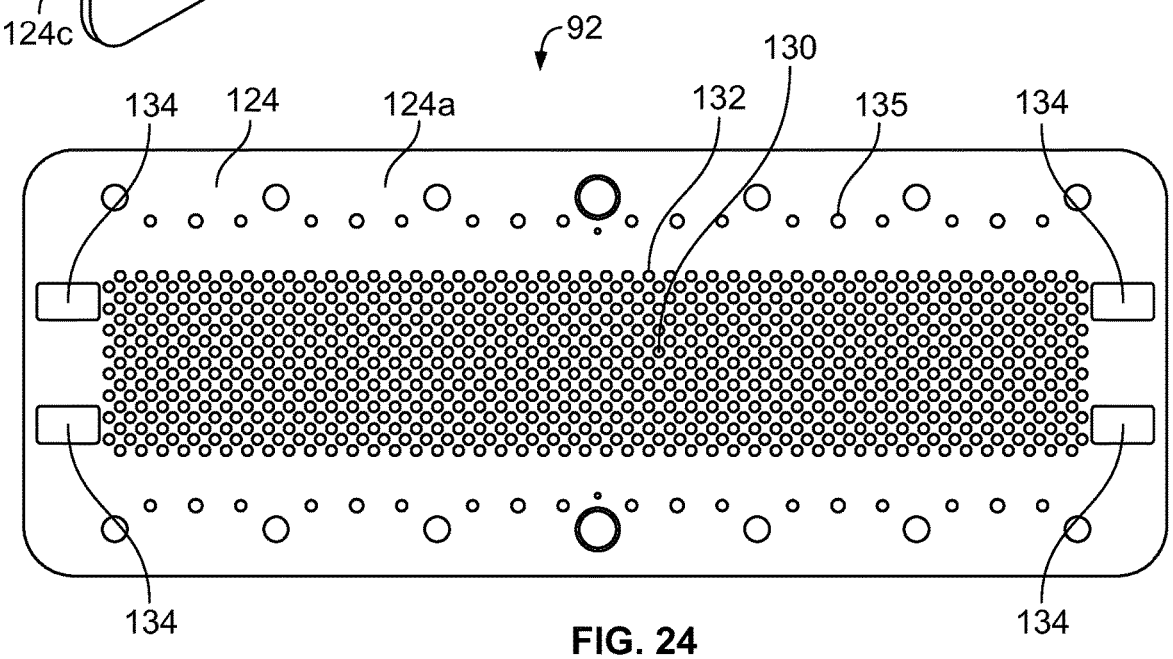
FIG. 24 depicts a plan view of the wear plate of FIG. 23.
Figure 25:
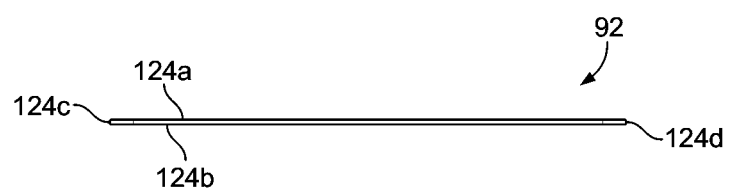
FIG. 25 depicts a side elevation view of the wear plate of FIG. 23.

As shown in FIGS. 23-25, the wear plate 92 is formed from a body 124 having a first surface 124a and a second surface 124b defined by parallel side edges 124c, 124d and parallel end edges 124e, 124f. The wear plate 92 is formed of metal. The first and second surfaces 124a, 124b are planar. A length of the wear plate 92 is defined between the side edges 124c, 124d. The body 124 has a central perforated portion 126 with a non-perforated portion 128 extending around the perimeter of the central perforated portion 126 and between the central perforated portion 126 and the edges 124c, 124d, 124e, 124f. An array of a plurality of distinct holes 130 are provided through the central perforated portion 126 of the body 124. The walls 132 forming the holes 130 are straight from the first surface 124a to the second surface 124b, that is each hole 130 has a uniform diameter along its length from the first surface 124a to the second surface 124b. The central axis of each hole 130 is parallel to each other. In an embodiment, the holes 130 in the wear plate 92 have the same diameter as the holes 104 in the body 96. In an embodiment, the holes 130 in the wear plate 92 have a diameter of 0.25 inches to 0.4375 inches. The wear plate 92 has two pairs of recesses 134 in each surface 124a, 124b in the non-perforated portion 128 proximate to, but spaced from, the side edges 124c, 124d. When the wear plate 92 is assembled with the body 96, the holes 130 in the wear plate 92 are aligned with the holes 104 in the body 96. The wear plate 92 has a plurality of apertures 135 through the non-perforated portion 128 proximate to, but spaced from, the end edges 124e, 124f.

The wear plate 92 can be assembled with the body 96 with either the first surface 124a abutting against the body 96 or with the second surface 124b abutting against the body 96 as the wear plate 92 is identically formed on both surfaces 124a, 124b.

The stripper plate 94 is disposed between the wear plate 92 and the pump box 26 and is capable of reciprocal movement relative to the wear plate 92 and the pump box 26. The stripper plate 94 is formed of metal. As shown in FIGS. 26-30, the stripper plate 94 is formed from a body 136 having an inlet surface 136a and an outlet surface 136b defined by parallel side edges 136c, 136d and parallel end edges 136e, 136f. The inlet and outlet surfaces 136a, 136b are planar. A length of the stripper plate 94 is defined between the side edges 136c, 136d. The body 136 has a central perforated portion 138 with a non-perforated portion 140 extending around the perimeter of the central perforated portion 138 and between the central perforated portion 138 and the edges 136c, 136d, 136e, 136f. An array of a plurality of distinct holes 142 are provided through the central perforated portion 138 of the body. Each hole 142 in the array may be straight as it extends from the inlet surface 136a to the outlet surface 136b such that it has a uniform diameter along its length. Each of the holes 142 in the array or predetermined ones of the holes 142 in the array may have a tapered or frustoconical wall 144 extending from the inlet surface 136a and a straight wall 145 extending from the outlet end of the tapered or frustoconical wall 144 to the outlet surface 136b. The tapered or frustoconical wall 144 has its greatest diameter at its inlet end which is at the inlet surface 136a of the stripper plate 94 and has its smallest diameter at its outlet end which is at the junction of the tapered or frustoconical wall 144 and the straight wall 145. The tapered or frustoconical wall 144 has a continuously reducing diameter as it extends along its length from its inlet end to the outlet end. The straight wall 145 has a uniform diameter along its length. The holes 142 may be a combination of both types. In an embodiment, the holes 142 in the stripper plate 94 are aligned in rows and columns. In an embodiment, the holes 142 in the stripper plate 94 have the same diameter as the holes 104 in the body 96. In an embodiment, the holes 142 in the stripper plate 94 have a diameter of 0.25 inches to 0.4375 inches.

Figure 26:
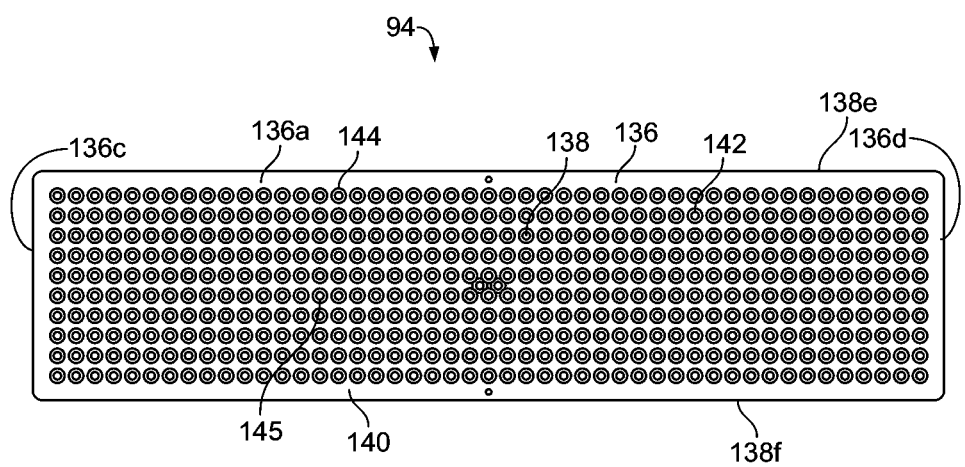
FIG. 26 depicts a plan view of an embodiment of a stripper plate of the rotary molding system.

In a first embodiment as shown in FIGS. 26 and 27, the holes 142 in the stripper plate 94 are aligned in rows and columns and when assembled with the wear plate 92 and in the fill plate 90, the holes 142 in the stripper plate 94 are aligned with the holes 130 in the wear plate 92 and the holes 104 in the body 96 when in a first position, and when the stripper plate 94 is shifted, the holes 142 in the stripper plate 94 are offset from the holes 130 in the wear plate 92 and in the holes 104 in the body 96 when in a second position. This forms a seal off version of the stripper plate 94

In a second embodiment as shown in FIGS. 28 and 29, the number of holes 142 in the stripper plate 94 are doubled from the first embodiment to form a non-seal off version of the stripper plate 94. A first column of holes 142 is defined at the first end of the stripper plate 94 and a second column of holes 142 is defined next to the first column of holes 142. The first and second columns of holes 142 alternate along the length of the stripper plate 94. When the stripper plate 94 is assembled with the wear plate 92 and in the fill plate 90, the first columns of holes 142 in the stripper plate 94 are aligned with the holes 130 in the wear plate 92 and in the holes 104 in the body 96 when in a first position, and when the stripper plate 94 is shifted, the second columns of holes 142 are aligned with the holes 130 in the wear plate 92 and in the holes 104 in the body 96 when in a second position.

Figure 31:
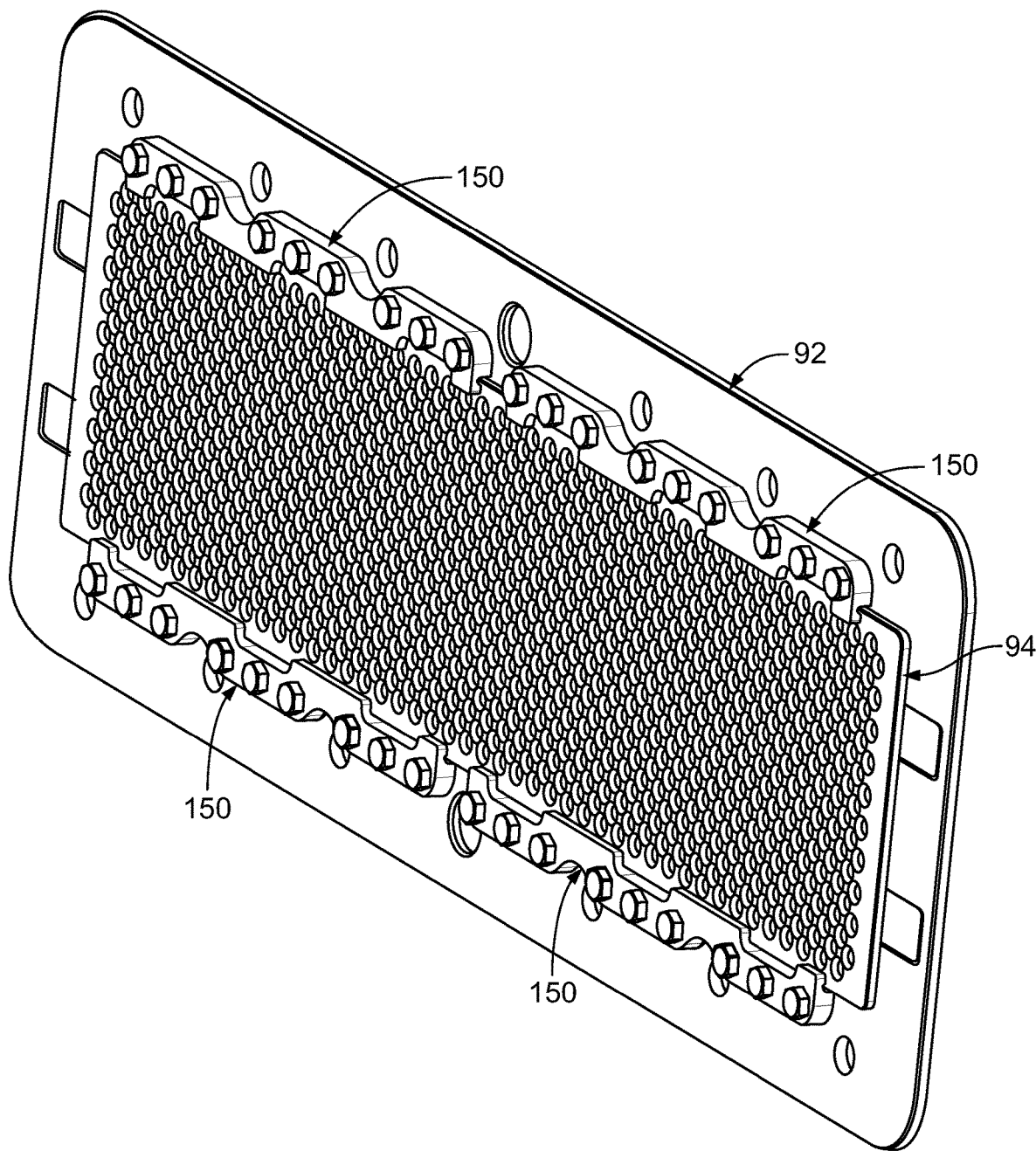
FIG. 31 depicts a perspective view of the stripper plate mounted on the wear plate by retainer bars.
Figure 32:
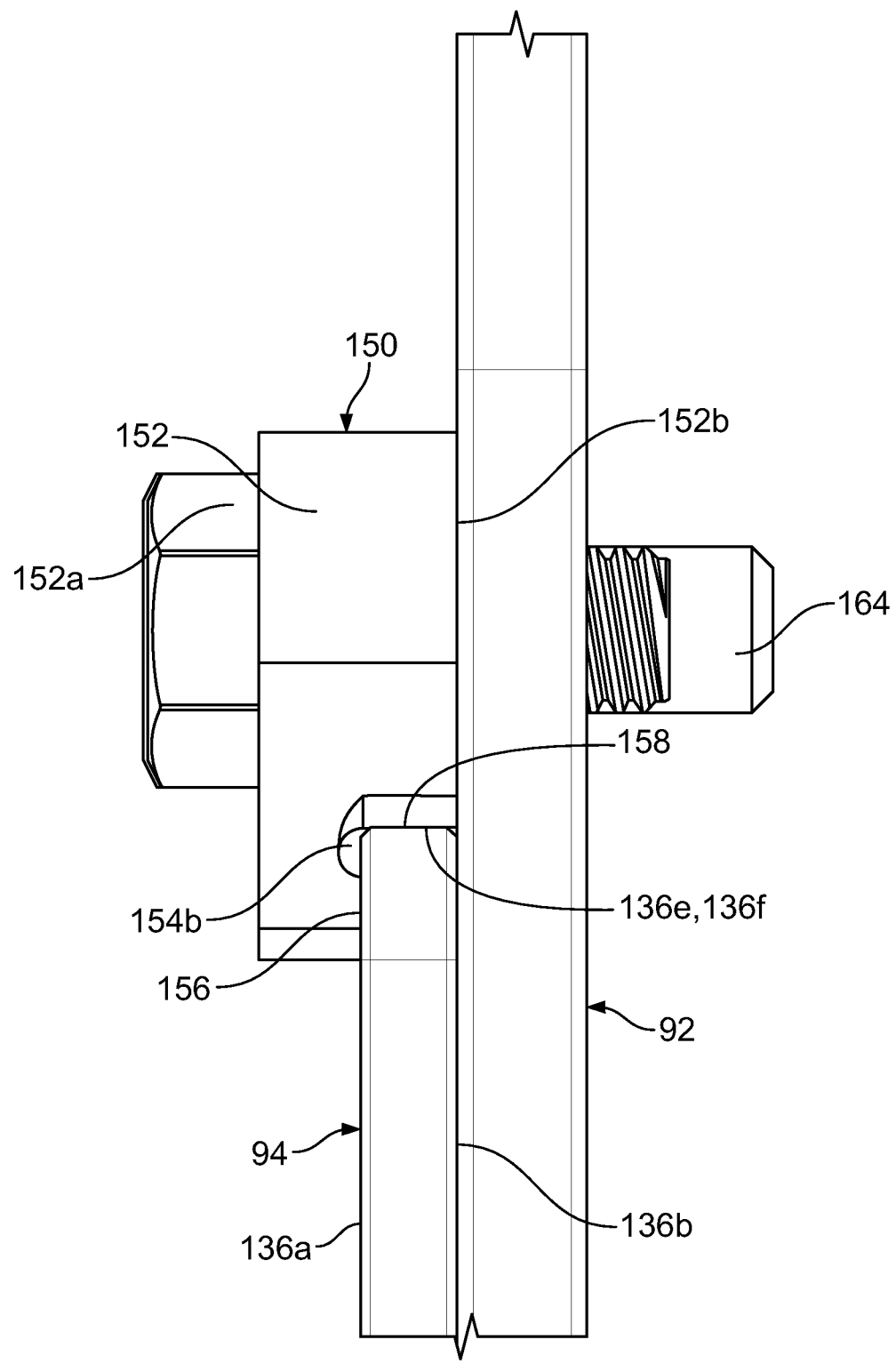
FIG. 32 depicts a partial side elevation view of the stripper plate mounted on the wear plate.
Figure 33:
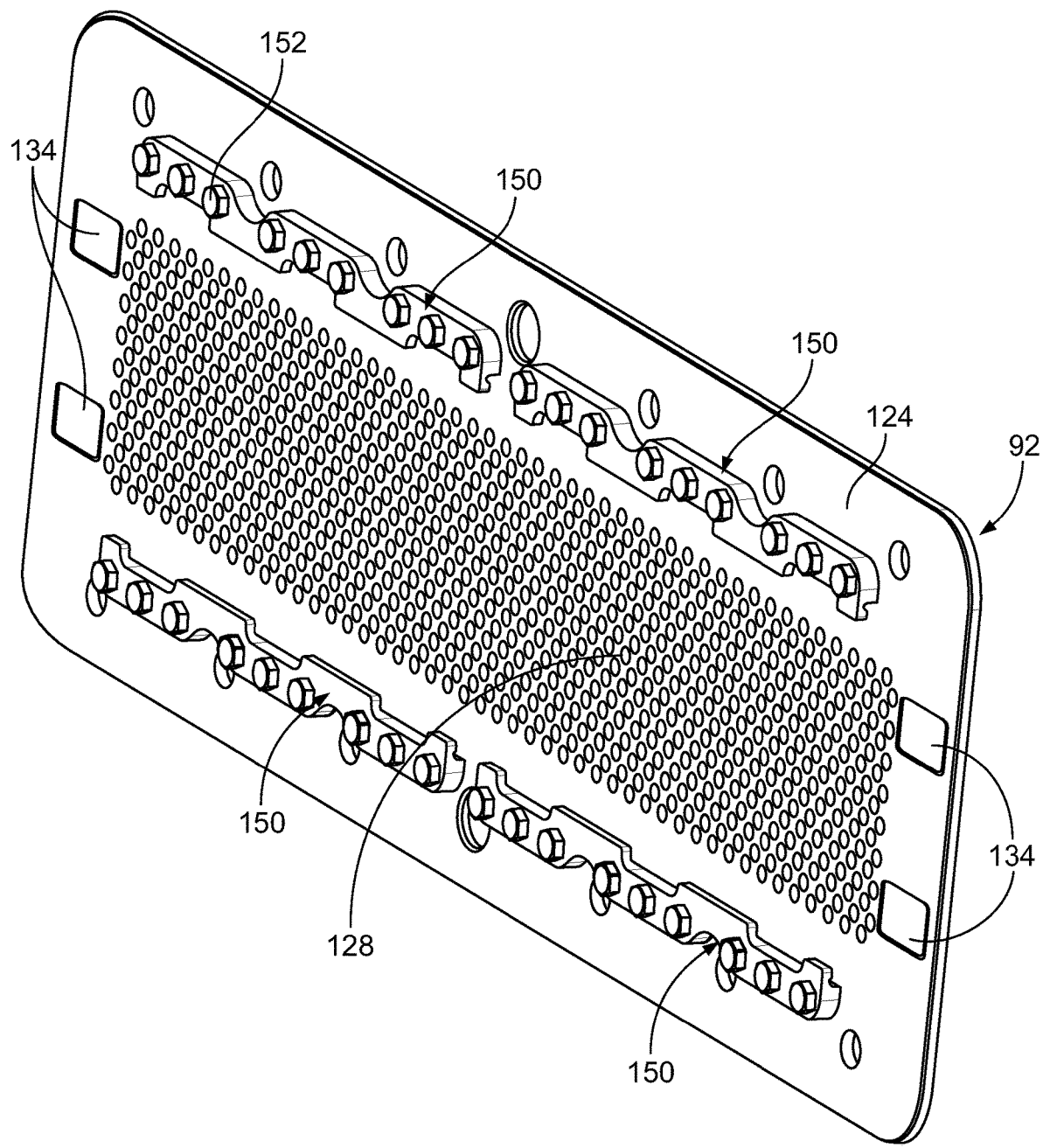
FIG. 33 depicts a perspective view of the wear plate and retainer bars.
Figure 34:
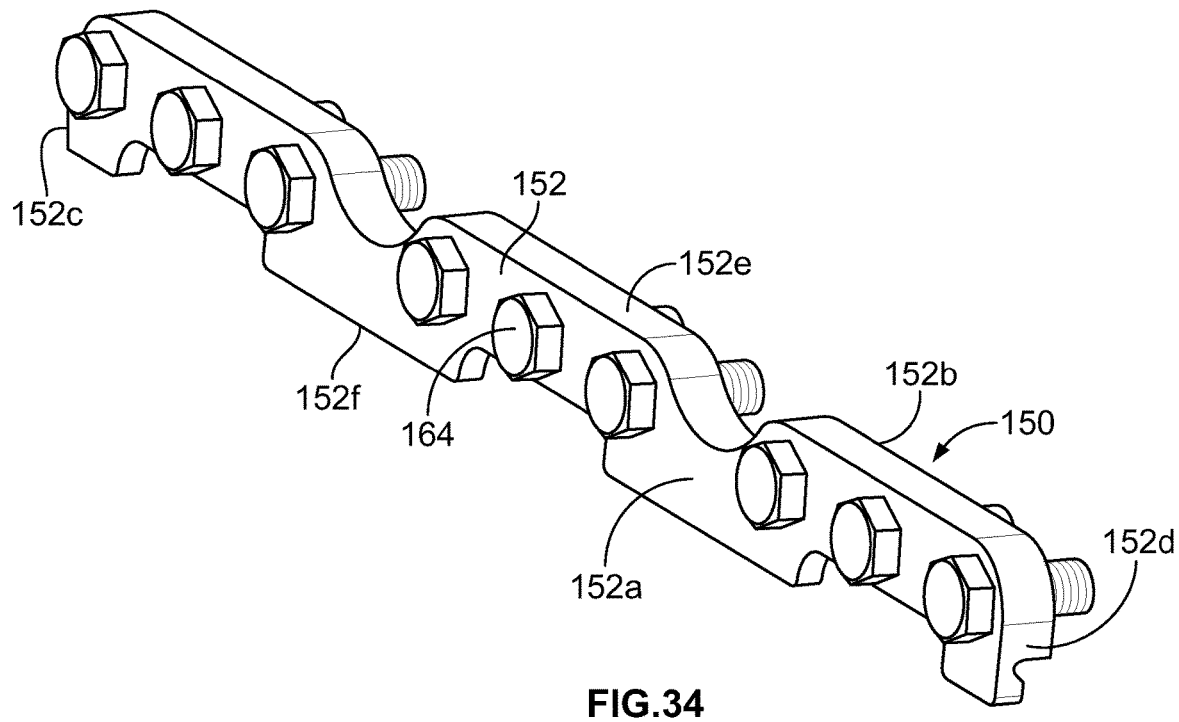
FIG. 34 depicts a perspective view of one of the retainer bars.
Figure 35:
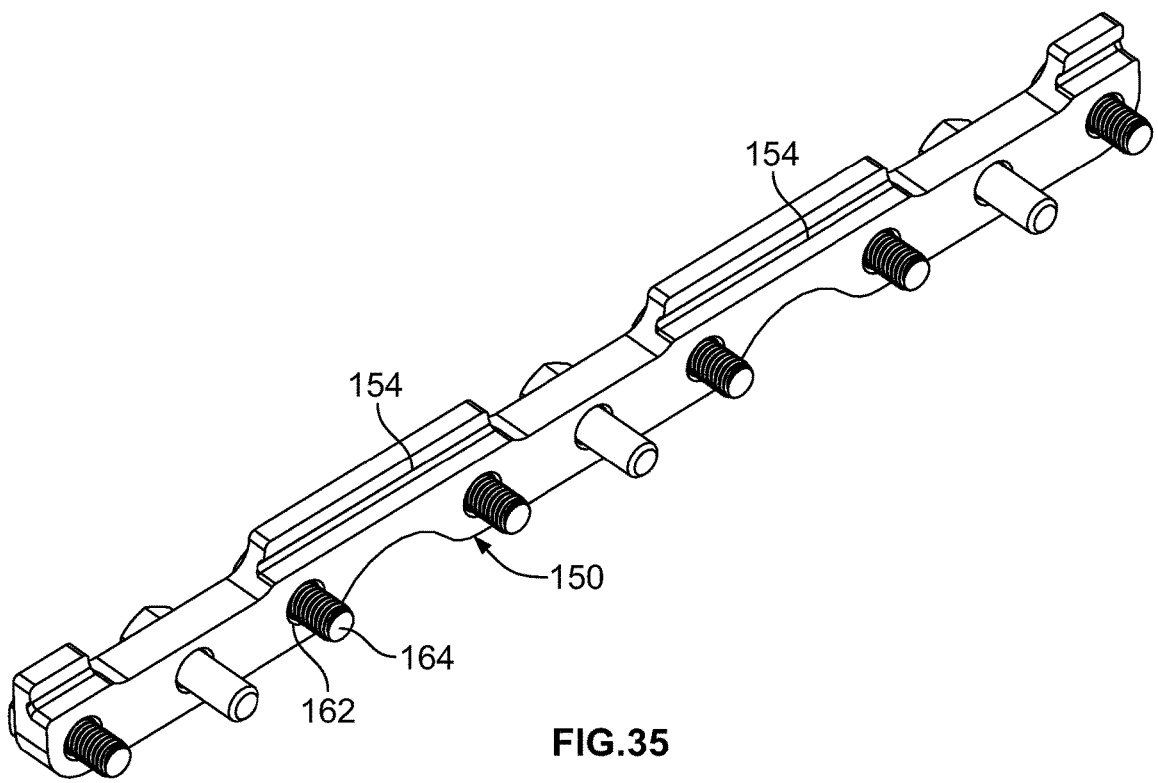
FIG. 35 depicts an alternate perspective view of one of the retainer bars.
Figure 36:
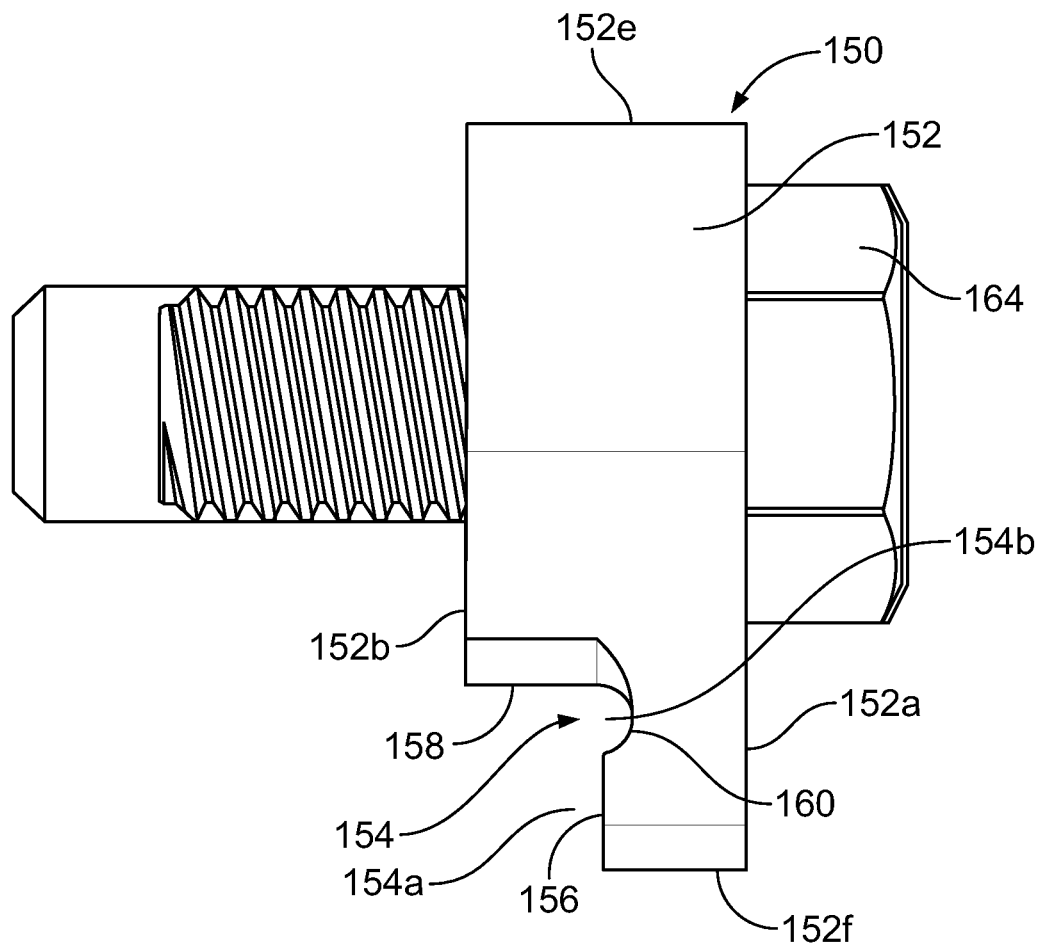
FIG. 36 depicts a side elevation view of one of the retainer bars.

The stripper plate 94 is connected to the wear plate 92 by retainer bars 150 attached to the wear plate 92 see FIGS. 31 and 32. In the prior art, as disclosed in United States Publication No. US 2007/0098862, the stripper plate was slidably attached to the fill plate by a plurality of spacers which had a thickness that is slightly greater than the thickness of the stripper plate and a plurality of bracket bars; the spacers and the bars being mounted by a plurality of fasteners. In the present disclosure, each retainer bar 150 combines the two prior art components into a single retainer bar 150. As best shown in FIGS. 34-26, the retainer bar 150 has an elongated body 152 having first and second surfaces 152a, 152b defined by parallel side edges 152c, 152d and parallel end edges 152e, 152f. A length is defined along the body 152 between the side edges 152c, 152d. A recess 154 is machined into the elongated body 152 along its length and has a first part 154a and a second part 154b. The first part 154a of the recess 154 is formed from a first planar wall 156 which extends from the end edge 152f and is offset from the second surface 152b and a second planar wall 158 which extends from the second surface 152b and is perpendicular to the first wall 156. The second part 154b is formed at the junction between the first and second walls 156, 158 and is form a curved wall 160. The curved wall 160 is offset from the second surface 152b at a greater distance than the first wall 156. The elongated body 152 has a plurality of spaced apart apertures 162 therethrough which will accept fasteners 164. The apertures 162 are offset from the recess 154.

Each retainer bar 150 is attached to the wear plate 92 by a plurality of the fasteners 164 that extend through the apertures 162 and through the associated apertures 135 in the wear plate 92. The second surface 152b of each retainer bar 150 abuts against one of the surfaces 124a, 124b of the wear plate 92 (depending upon which way the wear plate 92 is used).

The stripper plate 94 seats within the recesses 154 such that the edges 136e, 136f abut against the second wall 158, the inlet surface 136a abuts against the first wall 156 of the retainer bar 150, and the outlet surface 136b abuts against the first or second surface 124a, 124b of the wear plate 92 (depending upon which way the wear plate 92 is used).

The stripper plate 94 and the wear plate 92 seat within the pump box 26. The stripper plate 94 is proximate to the feed openings 34, 36 in the pump box 26. The planar inlet surface 96a of the body 96 which forms the fill plate 90 seats against the first or second surface 124a, 124b of the wear plate 92 (depending upon which way the wear plate 92 is used). Thereafter, fasteners, such as bolts, are passed through the pump box 26, through the wear plate 92 and through the fill plate 90 to connect the pump box 26, the stripper plate 94, the wear plate 92 and the fill plate 90 together.

As disclosed in U.S. Pat. No. 8,469,697, the contents of which have been incorporated herein, in an embodiment, two rods 146a, 146b, see FIG. 3, have disk shaped heads 148 that are in contact with the side edges 136c, 136d of the stripper plate 94. The rods 146a, 146b extend through the side walls of the pump box housing 28 and are connected to respective first and second drive mechanisms 147a, 147b, such as hydraulic cylinders. To move the stripper plate 94 relative to the wear plate 92, the first drive mechanism 147a is activated to extend the rods 146a and move the stripper plate 94 in a first direction thereby causing the rods 146b to retract within the second drive mechanism 147b, and thereafter the second drive mechanism 147b is activated to extend the rods 146b and move the stripper plate 94 in a second, opposite direction thereby causing the rods 146a to retract within the first drive mechanism 147a. This is repeated to cause the stripper plate 94 to slide back and forth across the wear plate 92 in a reciprocating manner. The heads 148 of the rods 146 seat within the recesses 134 of the wear plate 92 to abut against the side edges 136c, 136d of the stripper plate 94 to sever any residual food product fibers which may be caught in the holes 130 of the wear plate 92 after each time the food product is passed through the holes 130 of the wear plate 92. The recesses 154 provide a running clearance to allow the stripper plate 94 to shift relative to the wear plate 92. The operation of the stripper plate 94 is discussed in further detail in U.S. application Ser. No. 11/408,248, published as U.S. Patent Application Publication 2007/0098862, the contents of which have been incorporated herein.

Figure 37:
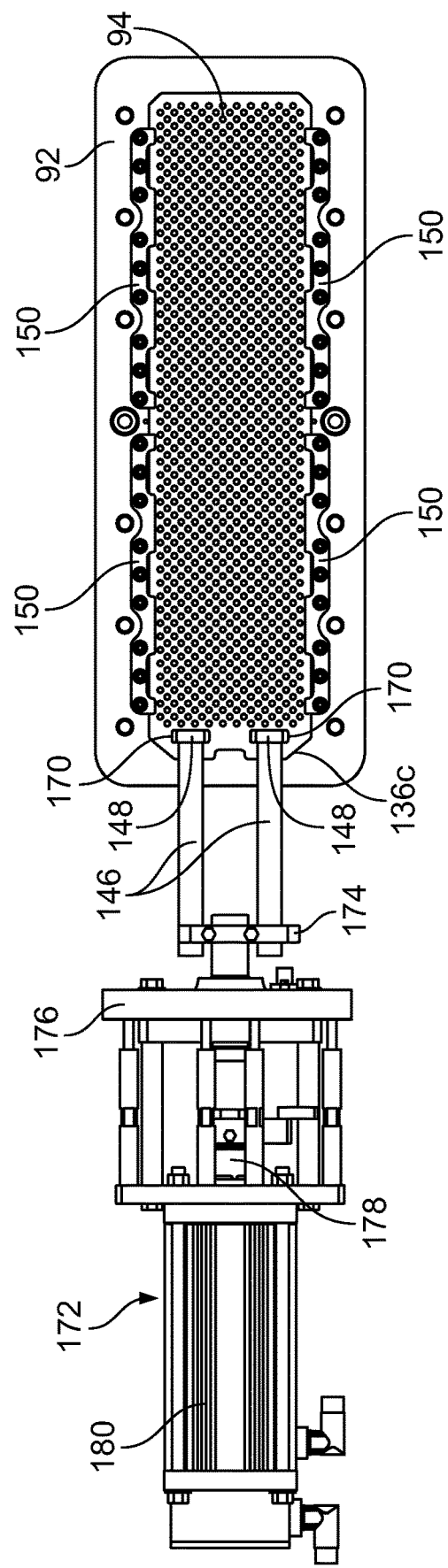
FIG. 37 depicts a plan view of a drive mechanism, a coupler, the stripper plate and the wear plate in accordance with an embodiment.

As shown in FIG. 37, the stripper plate 94 has been modified to include a pair of recess or apertures 170 into which the heads 148 of the rods 146 are seated. A pair of spaced apart apertures 170 are provided on surface 136a and on the same side of the stripper plate 94, for example, proximate to edge 136c. Alternatively, recesses may be provided on each surface of the stripper plate 94. Rods 146 extend through the same side wall of the pump box housing 28 and are connected to a single drive mechanism 172, such as an electric actuator or a hydraulic cylinder, by a coupler 174. The drive mechanism 172 is mounted on a stationary frame 176 connected to the pump box housing 28. The drive mechanism 172 includes a piston 178 which can be extended from a cylinder 180 or can be retracted into the cylinder 180. The piston 178 is coupled to the rods 146 by the coupler 174. In this embodiment, the piston 178 of the drive mechanism 172 is linearly aligned with the rods 146. To move the stripper plate 94 relative to the wear plate 92, the drive mechanism 172 is activated to extend the piston 178 from the cylinder 180, thereby moving the rods 146 and the stripper plate 94 in a first direction relative to the wear plate 92, and thereafter the drive mechanism 172 is activated to retract the piston 178 into the cylinder 180, thereby moving the rods 146 and the stripper plate 94 in a second, opposite direction relative to the wear plate 92. This is repeated to cause the stripper plate 94 to slide back and forth across the wear plate 92 in a reciprocating manner to sever any residual food product fibers which may be caught in the holes 130 of the wear plate 92 after each time the food product is passed through the holes 130 of the wear plate 92. The recesses 134 in the wear plate 92 may be eliminated as recesses 134 are not used in this embodiment.

Figure 38:
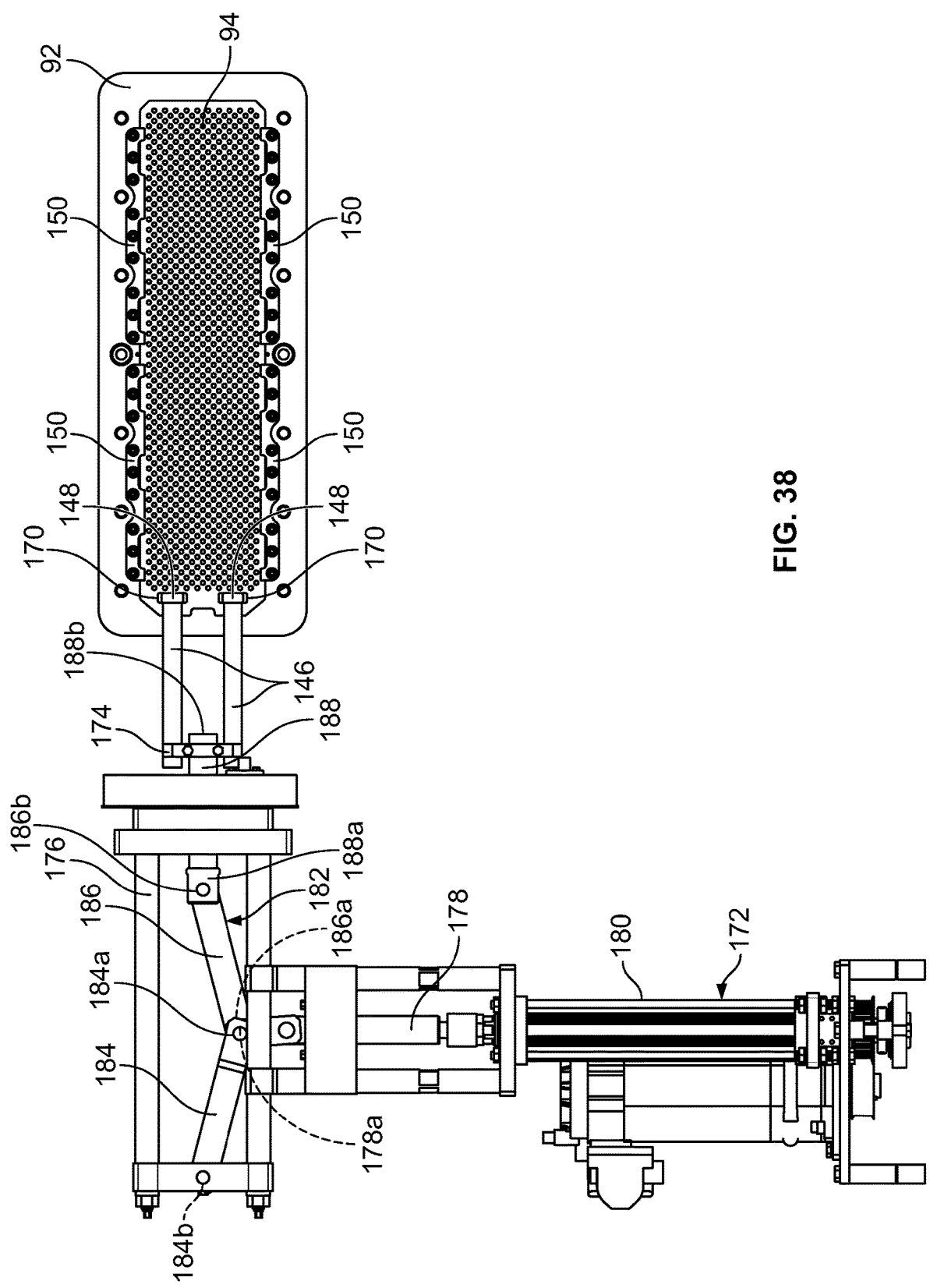
FIG. 38 depicts a plan view of a drive mechanism, a coupling arrangement, a coupler, the stripper plate and the wear plate in accordance with an embodiment.

As shown in FIG. 38, the modified stripper plate 94 and the drive mechanism 172 of FIG. 37 are used and the specifics are not repeated. The rods 146 extend through a side wall of the pump box housing 28 and are connected to the single drive mechanism 172 by a coupling arrangement 182. In this embodiment, the piston 178 of the drive mechanism 172 is not linearly aligned with the rods 146, and instead is perpendicular to the rods 146 as a result of the coupling arrangement 182. In this embodiment, the coupling arrangement 182 includes a first link 184 having a first end 184a pivotally attached to the end 178a of the piston 178 and second end 184b pivotally attached to a stationary frame 176 connected to the pump box housing 28, a second link 186 having a first end 186a pivotally attached to the end 178a of the piston 178 and second end 186b pivotally attached to a first end 188a of a rod 188, the rod 188 extending through the stationary frame 176. The rod 188 and the second end 184b of the first link 184 may be linearly aligned. A second end 188b of the rod 188 is coupled to the rods 146 by the coupler 174. To move the stripper plate 94 relative to the wear plate 92, the drive mechanism 172 is activated to move the rods 146 and the stripper plate 94 in a first direction relative to the wear plate 92, and thereafter the drive mechanism 172 is activated to move the rods 146 and the stripper plate 94 in a second, opposite direction relative to the wear plate 92. When the piston 178 is extended from the cylinder 180, the first ends 184a, 186a of the first and second links 184 move away from the cylinder 180 which causes the rod 188 to translate in a direction perpendicular to the piston 178 and toward the wear plate 92. This movement of the rod 188 causes movement of the rods 146 and then movement of the stripper plate 94 in the first direction. When the piston 178 is retracted into the cylinder 180, the first ends 184a, 186a of the first and second links 184 move toward the cylinder 180 which causes the rod 188 to translate in a direction perpendicular to the piston 178 and away from the wear plate 92. This movement of the rod 188 causes movement of the rods 146 and then movement of the stripper plate 94 in the second, opposite direction. This is repeated to cause the stripper plate 94 to slide back and forth across the wear plate 92 in a reciprocating manner to sever any residual food product fibers which may be caught in the holes 130 of the wear plate 92 after each time the food product is passed through the holes 130 of the wear plate 92. The recesses 134 in the wear plate 92 may be eliminated as recesses 134 are not used in this embodiment.

The rotary molding system 20 may include a knock-out mechanism 168 which is known in the art. Such a knock-out mechanism is disclosed in U.S. Pat. No. 8,469,697, the contents of which have been incorporated herein, and is not described in detail herein.

In operation, as the drum 42 rotates, the mold cavities 52 rotate past the holes 104 in the fill plate 90. Food product is pumped from the hopper 25 to the rotary molding system 20 by the feeder portion 24. Food product passes through feed openings 34, 36 in the pump box 26, through the holes 142 in the stripper plate 94, through the holes 130 in the wear plate 92, and through the holes 104 in the body 96 to fill the mold cavities 52. As the food product is injected into the mold cavities 52, any air within the mold cavities 52 is discharged via the air release passageway formed by the holes 64, the recesses 68 and the elongated opening 70 of the central perforated portion 60 of the inner platen 44. The mold cavities 52 are rotated from a fill position to an eject position where the knock-out mechanism 168 is activated.

During operation, the stripper plate 94 shifts relative to the wear plate 92 from the first position to the second position, then back to the first position and then to the second position and so on. Because the stripper plate 94 shifts, the wear plate 92 may become worn. When the wear plate 92 becomes worn on one surface, for example surface 124a, the wear plate 92 is flipped over so that the surface 124b is in contact with the shifting stripper plate 94 (the retainer bars 150 are detached from the one surface and reattached to the other surface during this flipping). When both surfaces 124a, 124b become worn, the wear plate 92 is replaced. Since the wear plate 92 is a planar plate with straight holes 130, this is a relatively inexpensive component to replace. The wear plate 92 is much less expensive to replace than replacing the curved body 96 which forms the fill plate 90.

During rotation of the drum 42, the drum facing surface 58a of the inner platen 44 is disposed in proximity to a portion of the inner surface 48b of the drum 42 with the rollers 80 engaging the inner surface 48b of the drum 42. Therefore, the drum 42 does not rub against the entire surface of the inner platen 44 and instead the drum 42 is only in contact with the rollers 80. This decreases the motor amperage required to rotate the drum 42. As the drum 42 rotates into the fill position, the mold cavities 52 in the drum 42 become disposed between the fill plate body 96 and the inner platen 44, with the drum facing surface 58a of the inner platen 44 serving as the bottom surface of the mold cavities 52 as the mold cavities 52 rotate through the region where it is in contact with the fill plate body 96 and the inner platen 44. The rollers 80 allow for the free rotation of the drum 42 relative to the inner platen 44. The inner platen 44 remains stationary as the drum 42 rotates past the inner platen 44. The support structure 38 behind the inner platen 44 provides support for the inner platen 44 as pressure from filling the mold cavities 52 is exerted into the mold cavities 52 during the filling process.

In the seal off embodiment of the stripper plate 94 shown in FIGS. 26 and 27, when the stripper plate 94 is in the first position, food product can flow therethrough to fill the mold cavities 52, but when the stripper plate 94 is moved to be in the second position to sever the food product, food product cannot flow therethrough. When the stripper plate 94 is in the second position, the drum 42 is indexed to rotate the next set of mold cavities 52 into position. The stripper plate 94 moves continuously between the first and second positions.

In the non-seal off embodiment of the stripper plate 94 shown in FIGS. 28 and 29, when the stripper plate 94 is in the first position, food product can flow therethrough to fill the mold cavities 52, and when the stripper plate 94 is in the second position, food product can flow therethrough to fill the mold cavities 52. To accommodate this, the drum 42 is constantly rotating. Each time the stripper plate 94 shifts, the food product is severed.

The rotary molding system 20 can be pivoted relative to the cabinet 40 as is known in the art, U.S. Pat. No. 8,469,697, the contents of which have been incorporated herein. A sensor 166, such as a proximity sensor or an ultrasonic sensor, may be provided on the cabinet 40 to monitor the position of the rods 146 to ensure that the rods 146 are retracted before pivoting. The sensor 166 is in communication with a control system (not shown) which is used to alert an operator if the rods 146 are not properly retracted. This aids in deterring damage to the rotary molding system 20.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A rotary molding system configured to mold food products, the rotary molding system comprising:
   a stripper plate having an inlet surface and an outlet surface, the inlet surface being in communication with a feed source, the stripper plate having a plurality of holes therethrough through which food product is configured to pass;
   a wear plate having a planar first surface and a planar second surface, the first surface of the wear plate abutting against the outlet surface of the stripper plate, the stripper plate being movable relative to the wear plate, the wear plate having a plurality of holes therethrough through which food product is configured to pass;
   a fill plate having an inlet surface and an outlet surface, the inlet surface of the fill plate abutting against the second surface of the wear plate, the fill plate having a plurality of holes therethrough through which food product is configured to pass, each hole in the fill plate being formed by a straight wall extending from the inlet surface of the fill plate and a tapered wall extending from an outlet end of the straight wall to the outlet surface of the fill plate, wherein a central axis of the straight wall and a central axis of the tapered wall are aligned with each other; and
   a drum having mold cavities into which food product is configured to be deposited, the drum being proximate to the outlet surface of the fill plate,
   wherein the wear plate is releasably attached to the stripper plate and the wear plate is releasably attached to the fill plate.

2. The rotary molding system of claim 1, wherein an outer surface of the drum is cylindrical and the outlet surface of the fill plate is curved.

3. The rotary molding system of claim 1, wherein the inlet and outlet surfaces of the stripper plate are planar.

4. The rotary molding system of claim 1, wherein the stripper plate is attached to the wear plate by a plurality of retainer bars.

5. The rotary molding system of claim 4, wherein each retainer bar includes a first recess and a second recess in communication with the first recess, the first recess being defined by a pair of planar surfaces, the second recess being defined by a curved surface, the stripper plate seating within the first recess.

6. The rotary molding system of claim 4, wherein each retainer bar is releasably attached to the wear plate.

7. The rotary molding system of claim 1, wherein each hole in the fill plate is formed by a wall extending from the inlet surface of the fill plate to the outlet surface of the fill plate which defines a length, and each hole in the fill plate has a uniform diameter along its length.

8. A rotary molding system configured to mold food products, the rotary molding system comprising:
   a stripper plate having an inlet surface and an outlet surface, the inlet surface being in communication with a feed source, the stripper plate having a plurality of holes therethrough through which food product is configured to pass;
   a wear plate having a planar first surface and a planar second surface, the first surface of the wear plate being proximate to the outlet surface of the stripper plate, the wear plate having a plurality of holes therethrough through which food product is configured to pass, wherein the stripper plate is attached to the wear plate by a plurality of retainer bars, wherein each retainer bar defines a recess into which the stripper plate seats, the stripper plate being capable of being moved in a reciprocating manner relative to the wear plate and relative to the retainer bars;
   a fill plate having an inlet surface and an outlet surface, the inlet surface of the fill plate being proximate to the second surface of the wear plate, the fill plate having a plurality of holes therethrough through which food product is configured to pass, the wear plate being releasably attached to the fill plate; and
   a drum having mold cavities into which food product is configured to be deposited, the drum being proximate to the outlet surface of the fill plate.

9. The rotary molding system of claim 8, wherein each retainer bar is releasably attached to the wear plate.

10. A rotary molding system configured to mold food products, the rotary molding system comprising:
    a stripper plate having an inlet surface and an outlet surface, the inlet surface being in communication with a feed source, the stripper plate having a plurality of holes therethrough through which food product is configured to pass;
    a wear plate having a first surface and a second surface, the first surface of the wear plate being proximate to the outlet surface of the stripper plate, the stripper plate being movable relative to the wear plate, the wear plate having a plurality of holes therethrough through which food product is configured to pass;
    a fill plate having an inlet surface and an outlet surface, the inlet surface of the fill plate being proximate to the second surface of the wear plate, the fill plate having a plurality of holes therethrough through which food product is configured to pass, the wear plate being releasably attached to the fill plate;
    a cylindrical drum having an inner surface, an outer surface and mold cavities into which food product is configured to be deposited, the outer surface of the drum being proximate to the outlet surface of the fill plate; and
    a platen mounted within the drum, the platen comprising a body having a plurality of passageways therethrough which are in communication with the mold cavities.

11. The rotary molding system of claim 10, wherein the platen comprises a plurality of fins alternating with recesses, the recesses forming a portion of the passageways.

12. The rotary molding system of claim 10, wherein the outlet surface of the fill plate is curved.

13. A rotary molding system configured to mold food products, the rotary molding system comprising:
    a stripper plate having an inlet surface and an outlet surface, the inlet surface being in communication with a feed source, the stripper plate having a plurality of holes therethrough through which food product is configured to pass;
    a wear plate having a planar first surface and a planar second surface, the first surface of the wear plate being proximate to the outlet surface of the stripper plate, the stripper plate being movable relative to the wear plate, the wear plate having a plurality of holes therethrough through which food product is configured to pass, wherein the stripper plate has twice as many holes as the wear plate;
    a fill plate having an inlet surface and an outlet surface, the inlet surface of the fill plate being proximate to the second surface of the wear plate, the fill plate having a plurality of holes therethrough through which food product is configured to pass, the wear plate being releasably attached to the fill plate; and
    a drum having mold cavities into which food product is configured to be deposited, the drum being proximate to the outlet surface of the fill plate.

14. A rotary molding system configured to mold food products, the rotary molding system comprising:
    a stripper plate having an inlet surface and an outlet surface, the inlet surface being in communication with a feed source, the stripper plate having a plurality of holes therethrough through which food product is configured to pass;
    a wear plate having a planar first surface and a planar second surface, the first surface of the wear plate abutting against the outlet surface of the stripper plate, the stripper plate being movable relative to the wear plate, the wear plate having a plurality of holes therethrough through which food product is configured to pass;
    a fill plate having an inlet surface and an outlet surface, the inlet surface of the fill plate abutting against the second surface of the wear plate, the fill plate having a plurality of holes therethrough through which food product is configured to pass, the holes in the fill plate being aligned in rows and columns such that a central row of holes is defined in the fill plate and adjacent rows of holes are defined in the fill plate, wherein each hole in the central row is formed by a straight wall extending from the inlet surface of the fill plate and a tapered wall extending from an outlet end of the straight wall to the outlet surface of the fill plate, and wherein a central axis of the straight wall and a central axis of the tapered wall are aligned with each other, and each hole in the fill plate in rows other than the central row being formed by a straight wall extending from the inlet surface of the fill plate and a tapered wall extending from an outlet end of the straight wall to the outlet surface of the fill plate, and wherein a central axis of the straight wall and a central axis of the tapered wall are angled relative to each other at an angle; and
    a drum having mold cavities into which food product is configured to be deposited, the drum being proximate to the outlet surface of the fill plate, wherein the wear plate is releasably attached to the stripper plate and the wear plate is releasably attached to the fill plate.

15. The rotary molding system of claim 14, wherein as the rows of holes in the fill plate progress outwardly from the central row, the angle increases.

16. The rotary molding system of claim 14, wherein an outer surface of the drum is cylindrical and the outlet surface of the fill plate is curved.

17. The rotary molding system of claim 14, wherein the inlet and outlet surfaces of the stripper plate are planar.

18. The rotary molding system of claim 14, wherein the stripper plate is attached to the wear plate by a plurality of retainer bars.

19. The rotary molding system of claim 18, wherein each retainer bar includes a first recess and a second recess in communication with the first recess, the first recess being defined by a pair of planar surfaces, the second recess being defined by a curved surface, the stripper plate seating within the first recess.

20. The rotary molding system of claim 18, wherein each retainer bar is releasably attached to the wear plate.

21. The rotary molding system of claim 14, wherein each hole in the fill plate is formed by a wall extending from the inlet surface of the fill plate to the outlet surface of the fill plate which defines a length, and each hole in the fill plate has a uniform diameter along its length.

22. A fill plate for a food patty forming machine comprising:
   a body having an inlet surface and an outlet surface, a plurality of holes through which food product is configured to pass, the holes extending from the inlet surface to the outlet surface,
   the holes being aligned in rows and columns such that a central row of holes is defined and adjacent rows of holes are defined in the fill plate,
   each hole in the central row is formed by a straight wall extending from the inlet surface and a tapered wall extending from an outlet end of the straight wall to the outlet surface, wherein a central axis of the straight wall and a central axis of the tapered wall are aligned with each other; and
   wherein each hole in rows other than the central row is formed by a straight wall extending from the inlet surface and a tapered wall extending from an outlet end of the straight wall to the outlet surface, wherein a central axis of the straight wall and a central axis of the tapered wall are angled relative to each other at an angle.

23. The fill plate of claim 22, wherein as the rows of holes progress outwardly from the central row, the angle increases.

* * * * *